United States Patent
Pleiss et al.

(10) Patent No.: US 8,776,438 B2
(45) Date of Patent: Jul. 15, 2014

(54) DOOR MODULE FOR INSTALLATION IN A MOTOR VEHICLE DOOR

(75) Inventors: Eberhard Pleiss, Schwaigern (DE); Ralph Hebe, Horb (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 13/255,470

(22) PCT Filed: Mar. 9, 2010

(86) PCT No.: PCT/EP2010/052959
§ 371 (c)(1),
(2), (4) Date: Oct. 17, 2011

(87) PCT Pub. No.: WO2010/112305
PCT Pub. Date: Oct. 7, 2010

(65) Prior Publication Data
US 2012/0036780 A1    Feb. 16, 2012

(30) Foreign Application Priority Data

Mar. 10, 2009  (DE) .......................... 10 2009 012 645
Mar. 10, 2009  (DE) ..................... 20 2009 003 452 U

(51) Int. Cl.
*E05F 11/38*    (2006.01)

(52) U.S. Cl.
USPC .............................................. 49/348; 49/502

(58) Field of Classification Search
USPC ................... 49/348, 349, 352, 372, 374, 502; 296/146.2, 146.5, 146.1, 201
See application file for complete search history.

(56) References Cited

U.S. PATENT DOCUMENTS 3,844,064 A  *  10/1974   Yamaha et al. .................. 49/348
4,089,134 A      5/1978   Koike
(Continued)

FOREIGN PATENT DOCUMENTS

CN    1655960 A    8/2005
CN    1742148 A    3/2006
(Continued)

OTHER PUBLICATIONS

International Search Report, dated Jul. 20, 2010, corresponding to PCT/EP2010/052959, 4 pages.

(Continued)

*Primary Examiner* — Katherine Mitchell
*Assistant Examiner* — Scott Denion
(74) *Attorney, Agent, or Firm* — Christie, Parker & Hale, LLP

(57) ABSTRACT

A door module for installation in a motor vehicle door is provided. The door module comprising a door module carrier to be installed in a motor vehicle door and a plurality of functional components of a motor vehicle door pre-installed on the door module carrier that are to be installed together with the door module carrier in the motor vehicle door. There is at least one guide rail of a motor vehicle window lifter amongst the functional components pre-installed on the door module carrier that can be fixed in an operating position at fastening points on the door module carrier side such that it extends in the operating position along the adjustment direction of the window pane to be adjusted by means of the window lifter. To this end there are at least two different sets of fastening points on the door module carrier side, spaced apart from each other, on the door module carrier that serve to selectively arrange the one guide rail of the window lifter in a first or at least one other different operating position, wherein the guide rail is aligned in each operating position to guide the window pane that is to be adjusted by means of the window lifter along the adjustment direction thereof.

15 Claims, 25 Drawing Sheets

(56) References Cited

U.S. PATENT DOCUMENTS

| | | | | |
|---|---|---|---|---|
| 4,761,915 | A | * | 8/1988 | Marz .............................. 49/374 |
| 5,226,259 | A | | 7/1993 | Yamagata et al. |
| 5,902,004 | A | | 5/1999 | Waltz et al. |
| 5,960,588 | A | * | 10/1999 | Wurm et al. .................... 49/352 |
| 6,152,646 | A | | 11/2000 | Müller-Blech et al. |
| 6,354,653 | B1 | | 3/2002 | Seeberger et al. |
| 6,484,448 | B2 | * | 11/2002 | Spurr et al. .................... 49/506 |
| 6,571,515 | B1 | * | 6/2003 | Samways et al. .............. 49/502 |
| 8,069,610 | B2 | * | 12/2011 | Graf et al. ...................... 49/348 |
| 2001/0037608 | A1 | * | 11/2001 | Spurr et al. .................... 49/503 |
| 2005/0235574 | A1 | | 10/2005 | Gomez Camara et al. |
| 2006/0156631 | A1 | | 7/2006 | Koelle et al. |
| 2007/0163177 | A1 | * | 7/2007 | Heyer et al. .................... 49/348 |
| 2007/0214726 | A1 | * | 9/2007 | Graf et al. ...................... 49/352 |
| 2007/0271849 | A1 | * | 11/2007 | Kriese et al. ................... 49/348 |
| 2008/0022601 | A1 | * | 1/2008 | Smith ............................ 49/502 |
| 2008/0222962 | A1 | | 9/2008 | Staser et al. |
| 2011/0107676 | A1 | * | 5/2011 | Rietdijk ......................... 49/358 |
| 2011/0225888 | A1 | * | 9/2011 | Aschmutat et al. ............ 49/352 |

FOREIGN PATENT DOCUMENTS

| | | |
|---|---|---|
| DE | 26 34 778 A1 | 6/1977 |
| DE | 41 39 192 A1 | 6/1992 |
| DE | 196 19 087 A1 | 11/1997 |
| DE | 196 22 310 A1 | 12/1997 |
| DE | 196 54 956 A1 | 3/1998 |
| DE | 197 81 793 T1 | 5/1999 |
| DE | 299 16 066 U1 | 7/2000 |
| DE | 199 44 347 B4 | 4/2001 |
| DE | 10 2005 013 201 A1 | 12/2005 |
| DE | 10 2006 002 436 A1 | 7/2007 |
| DE | 10 2006 007 679 A1 | 8/2007 |
| EP | 1 488 944 A1 | 12/2004 |
| GB | 2 328 911 A | 3/1999 |
| JP | 11-013335 A | 1/1999 |
| JP | 2000-062465 A | 2/2000 |
| JP | 2001-270329 A | 10/2001 |
| RU | 6576 U1 | 5/1998 |
| WO | WO 2004/012951 A1 | 2/2004 |
| WO | WO 2004/065738 A1 | 8/2004 |
| WO | WO 2006/074632 A1 | 7/2006 |

OTHER PUBLICATIONS

English translation of the International Preliminary Report on Patentability, corresponding to PCT/EP2010/052959, dated Sep. 20, 2011, 10 pages.

English translation of Japanese examination report for Application No. 2011-553419, dated May 7, 2013, 4 sheets.

Japanese examination report for Application No. 2011-553419, dated May 7, 2013, 4 sheets.

Chinese Office action for Application No. 201080011483.5, dated Apr. 22, 2013 (8 sheets), and English translation (8 sheets).

Summary of main points of Mexican Institute of Industrial Property Office action for Mexican Application No. Mx/a/2011/009409, dated Dec. 17, 2013, 1 page.

Japanese Examination Report for Application No. 2011-553419, dated Feb. 4, 2014, 3 pages.

* cited by examiner

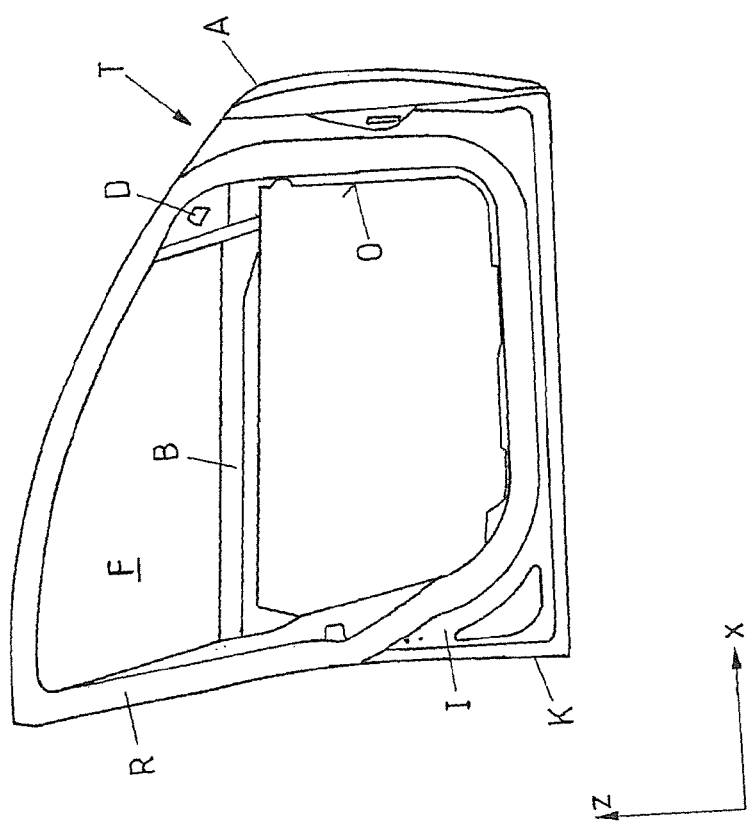
FIG 1A
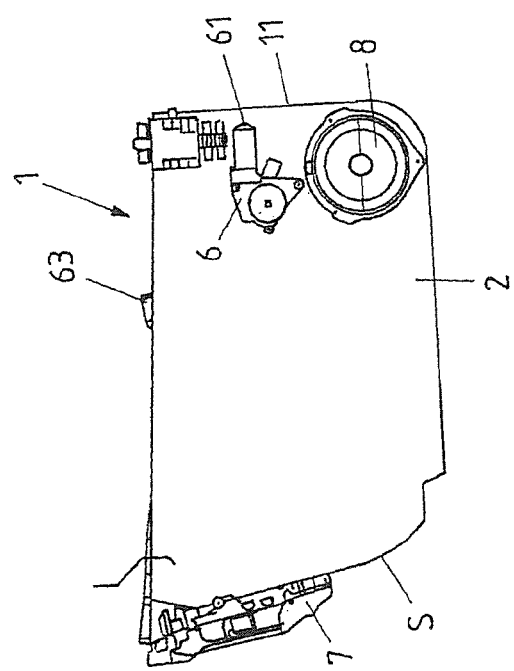

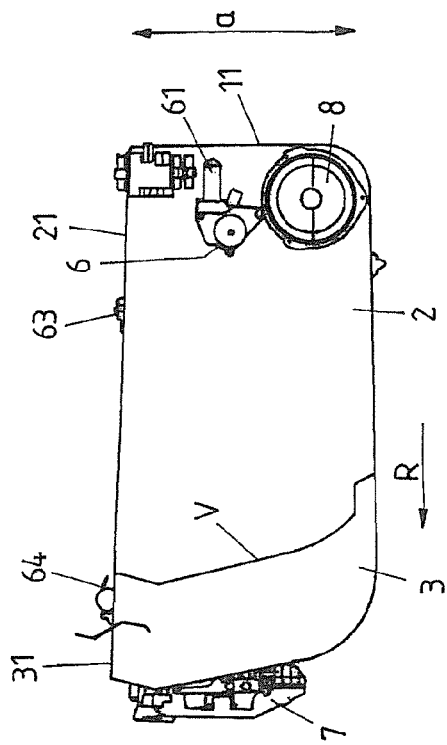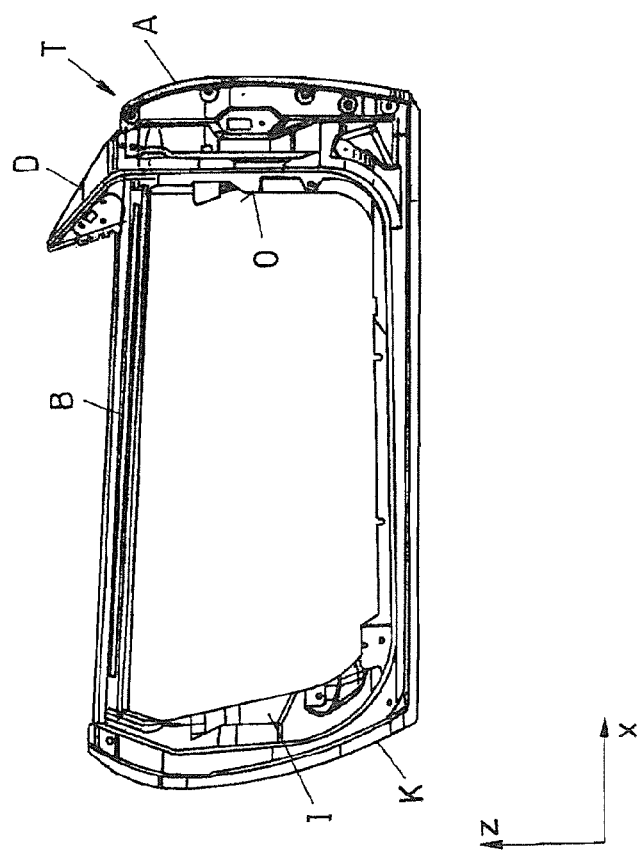

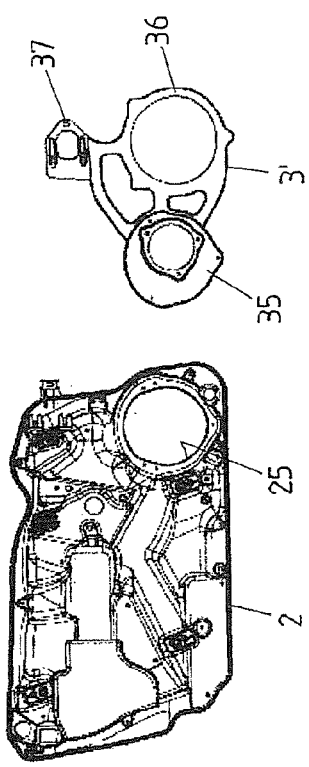
FIG 2A
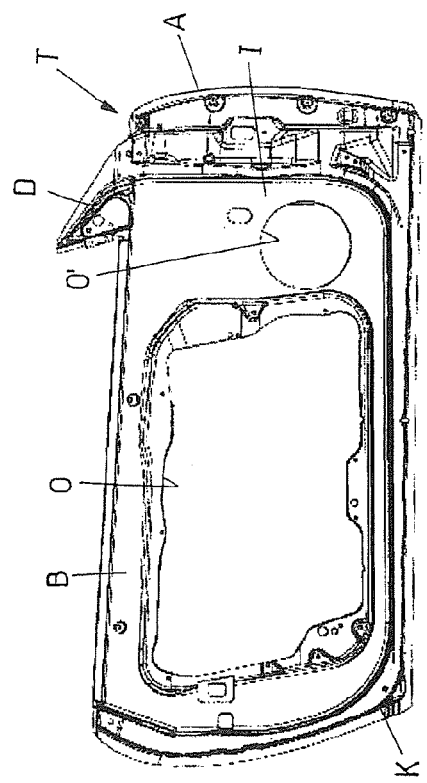
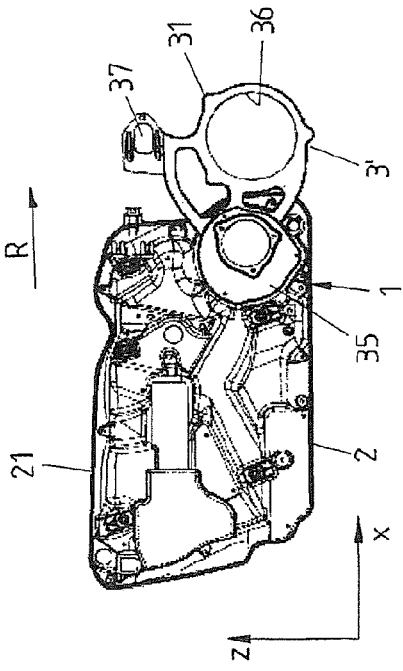
FIG 2B

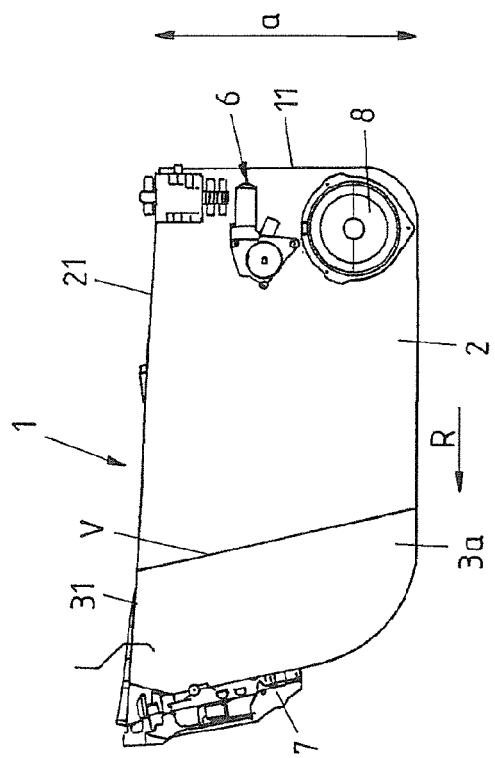
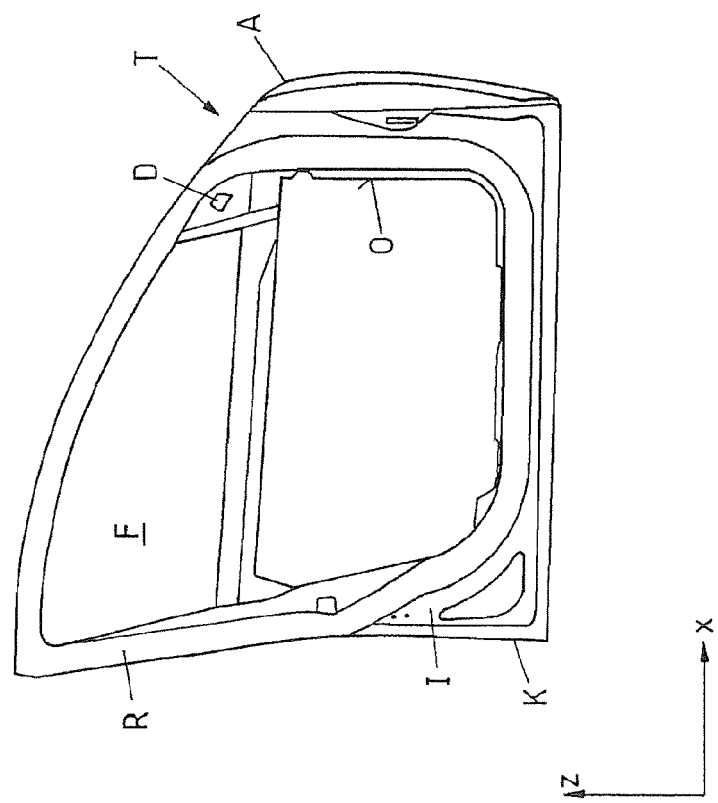
FIG 3A

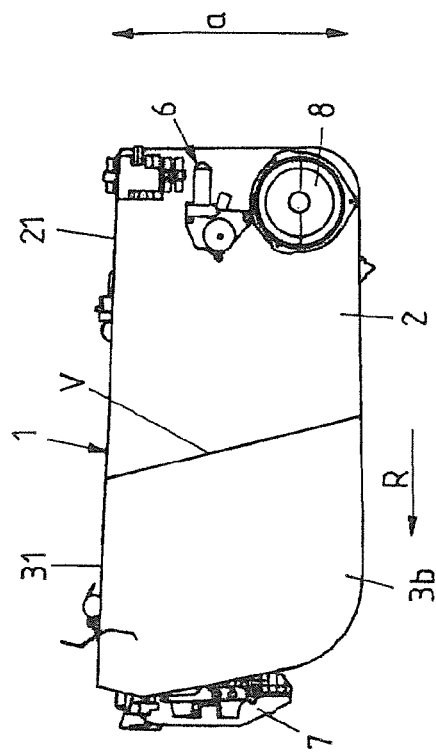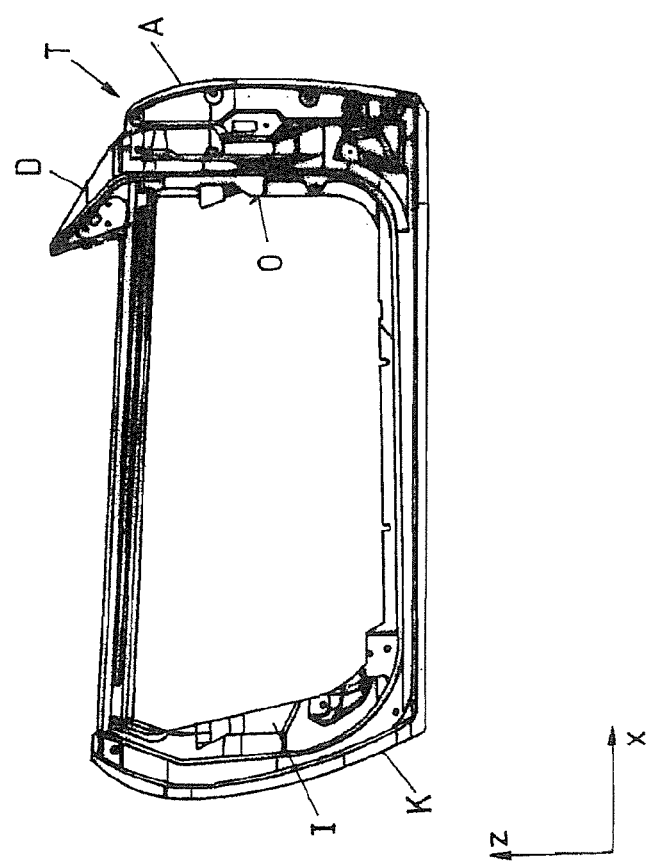

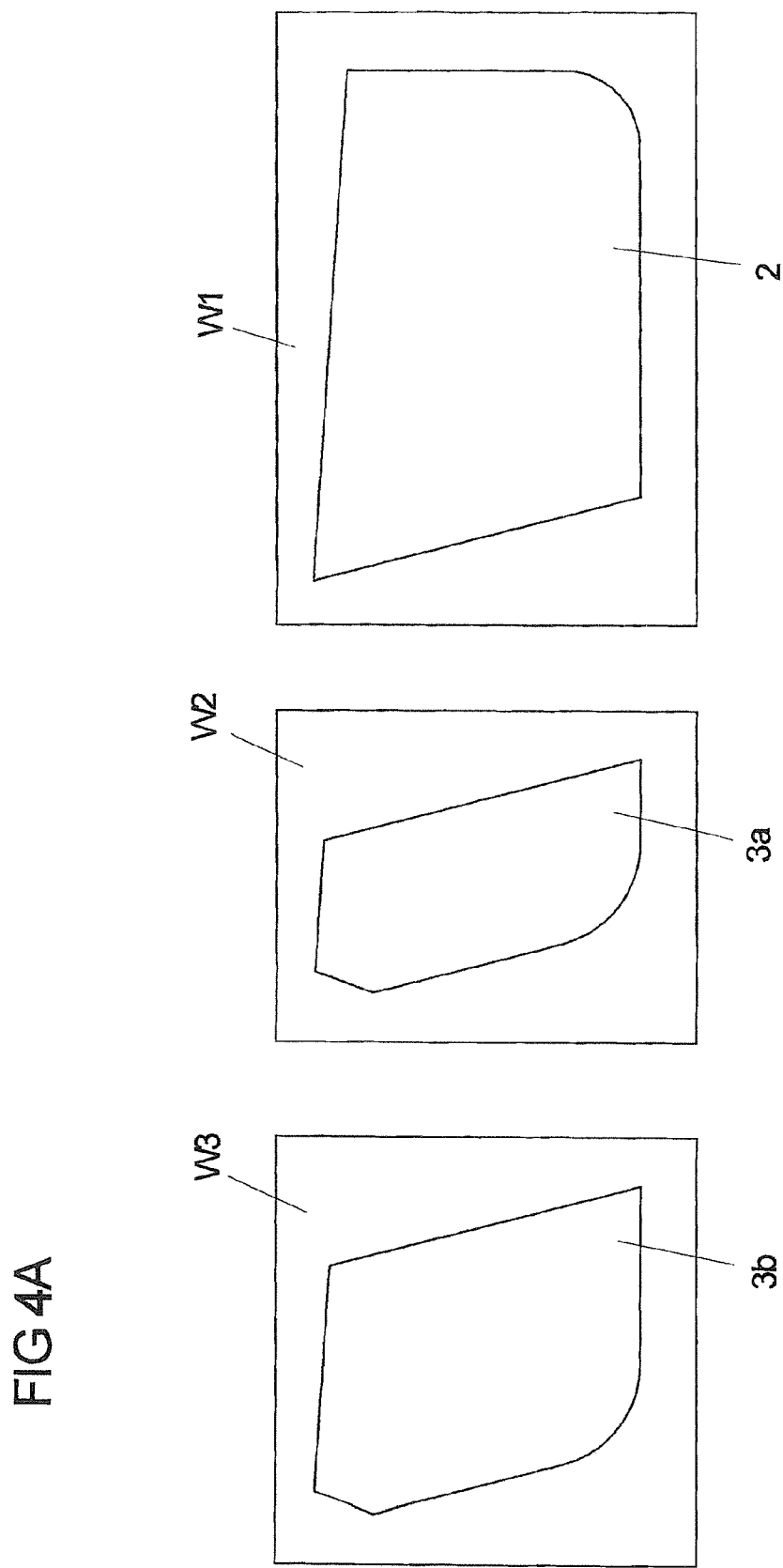

FIG 4B
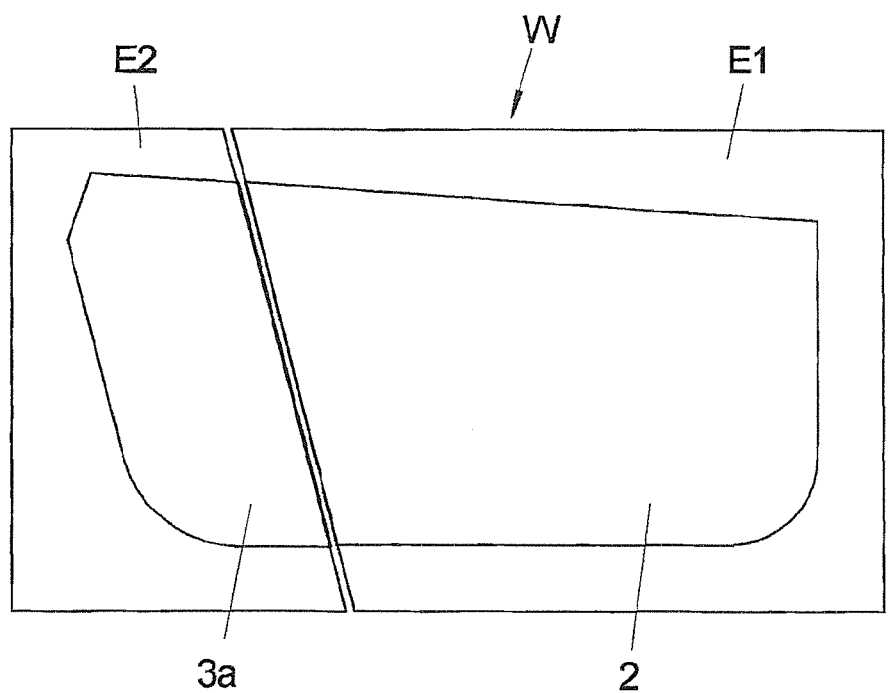
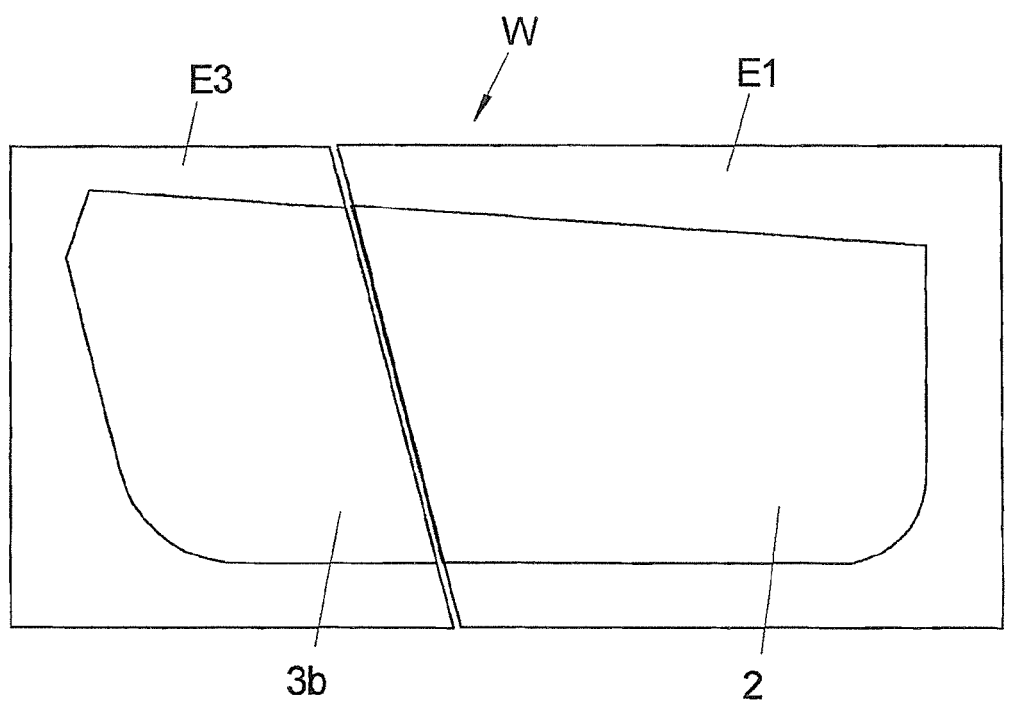

FIG 5A
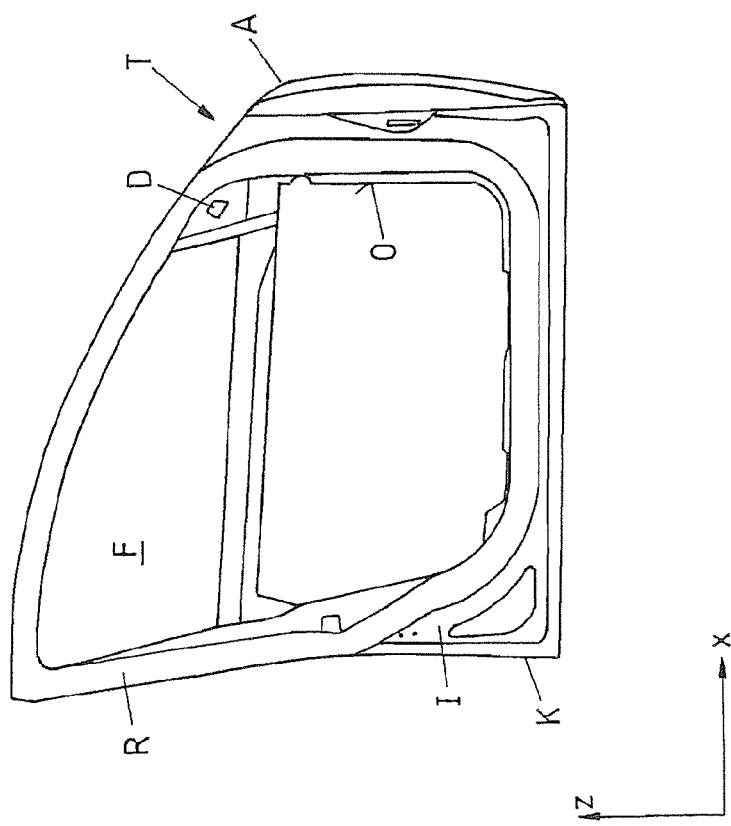
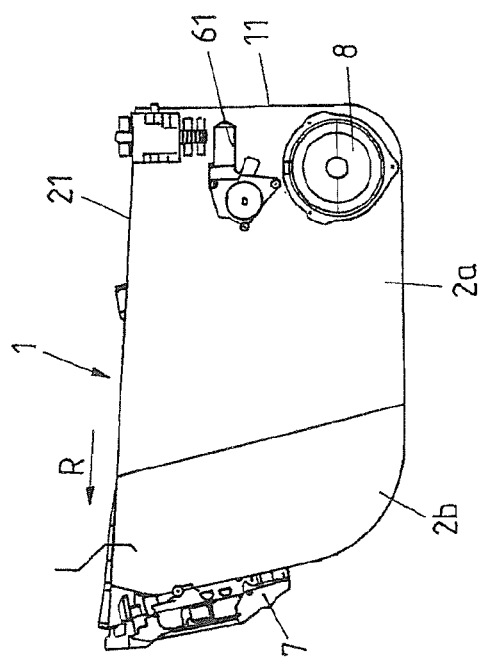

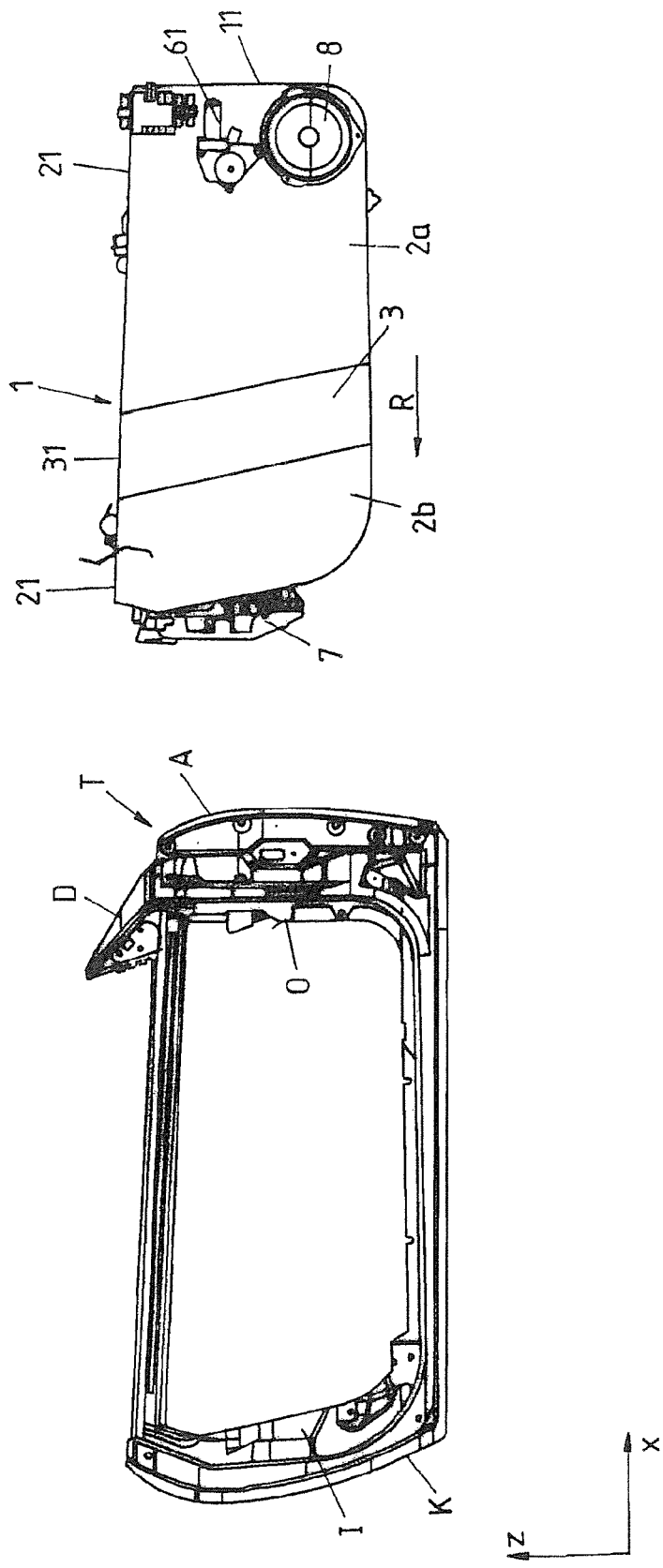

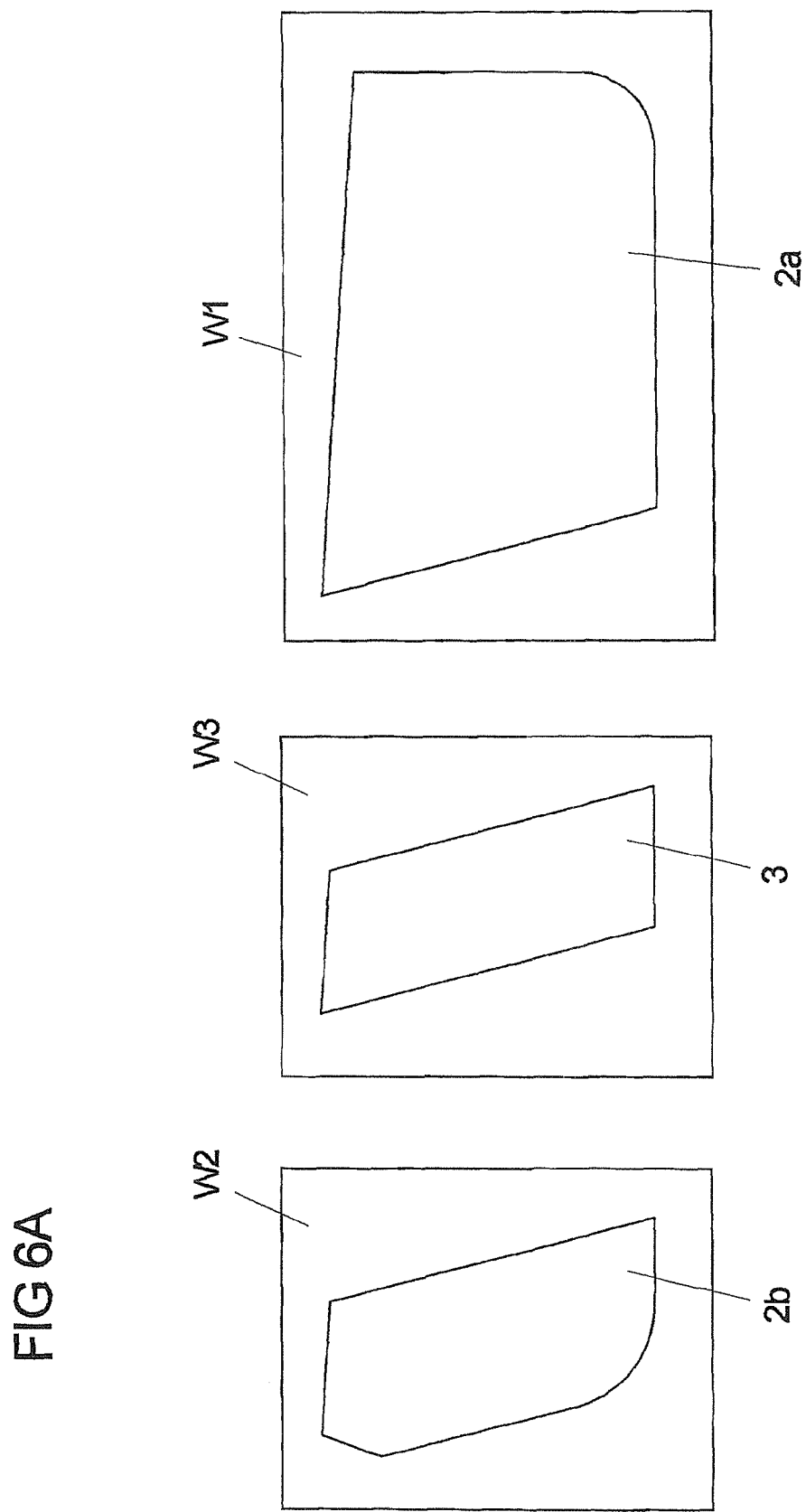

FIG 6B
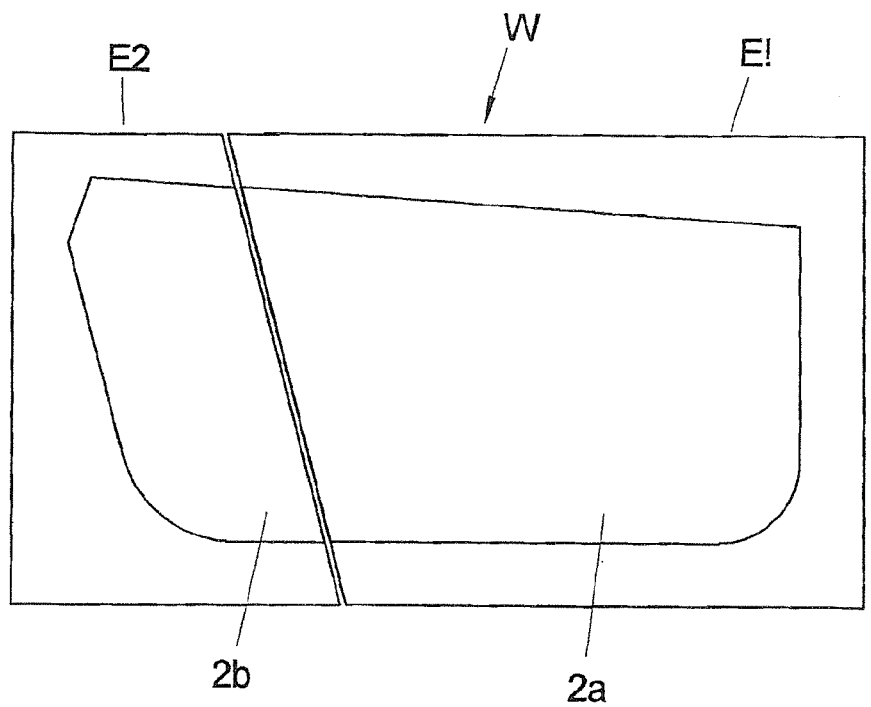
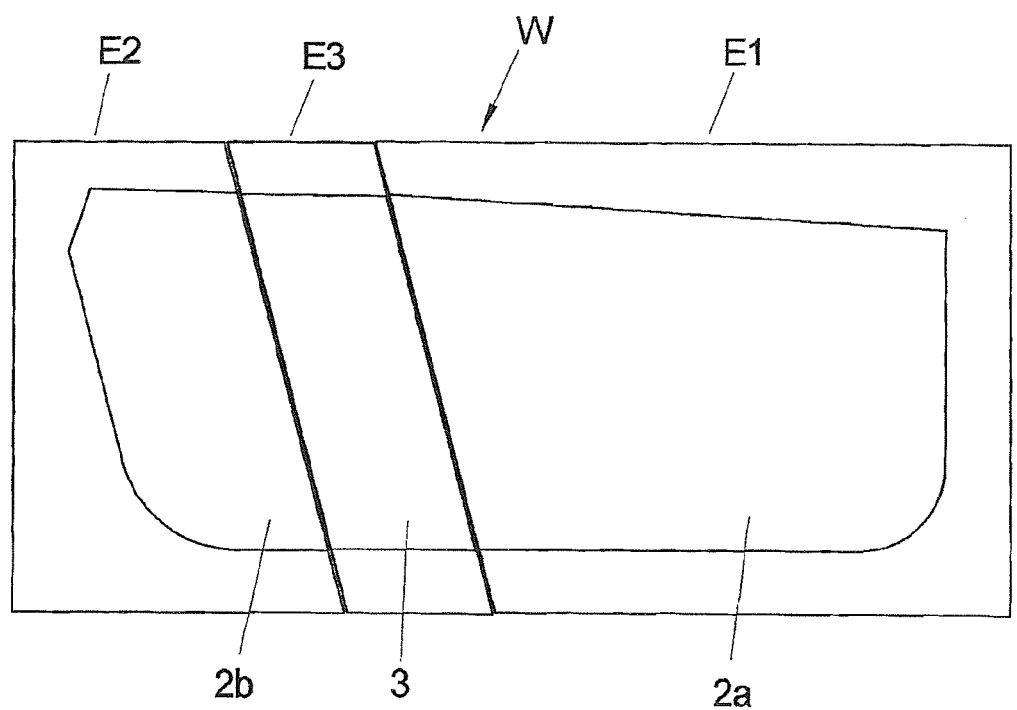

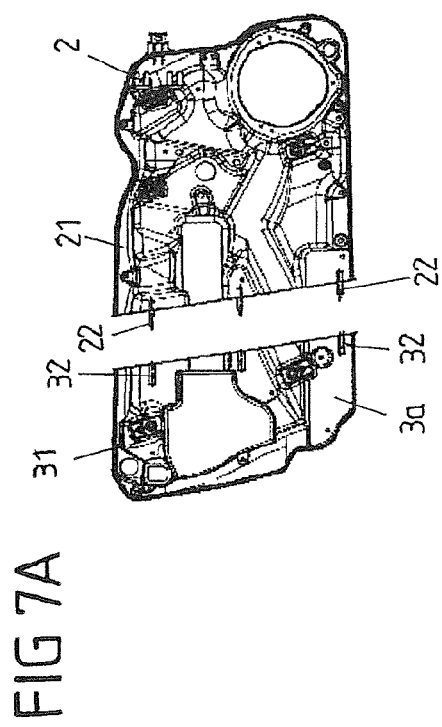
FIG 7A
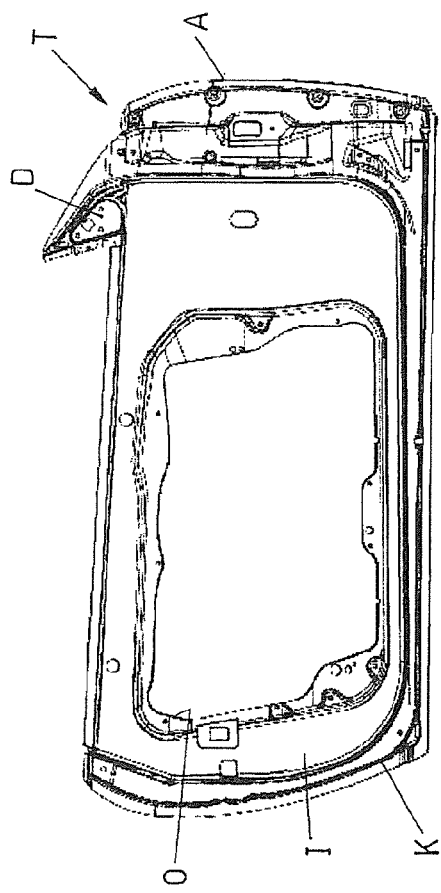
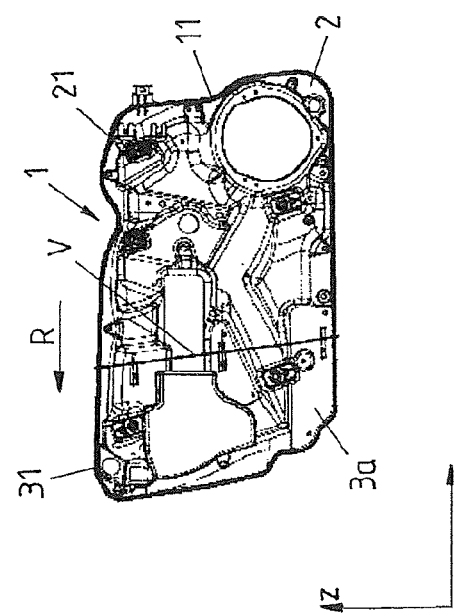
FIG 7B

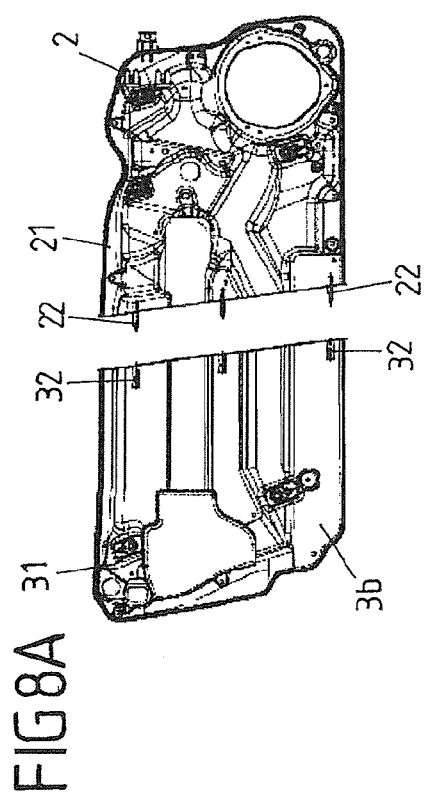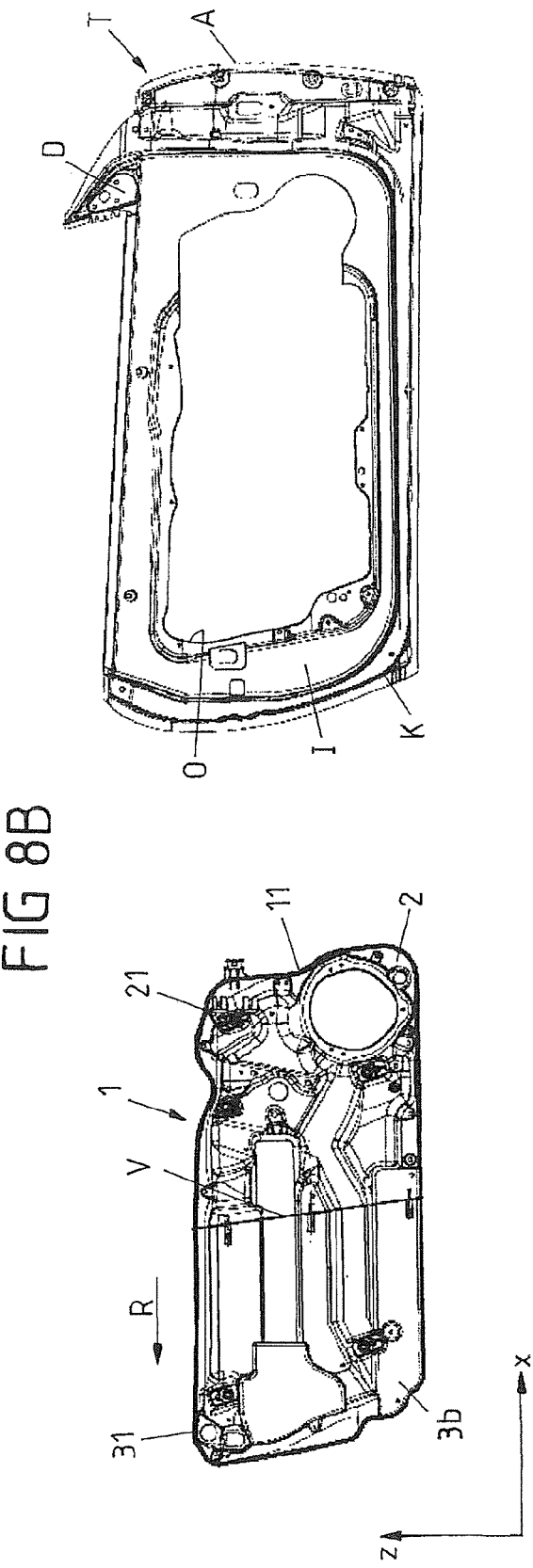

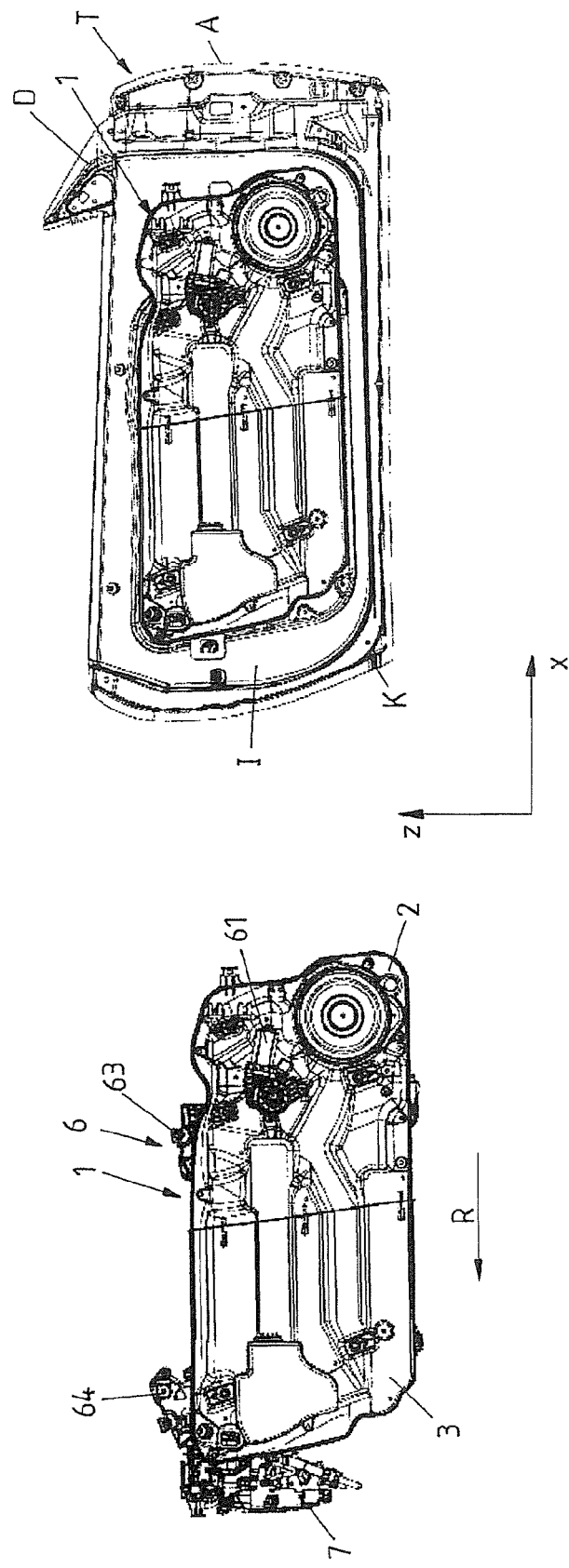

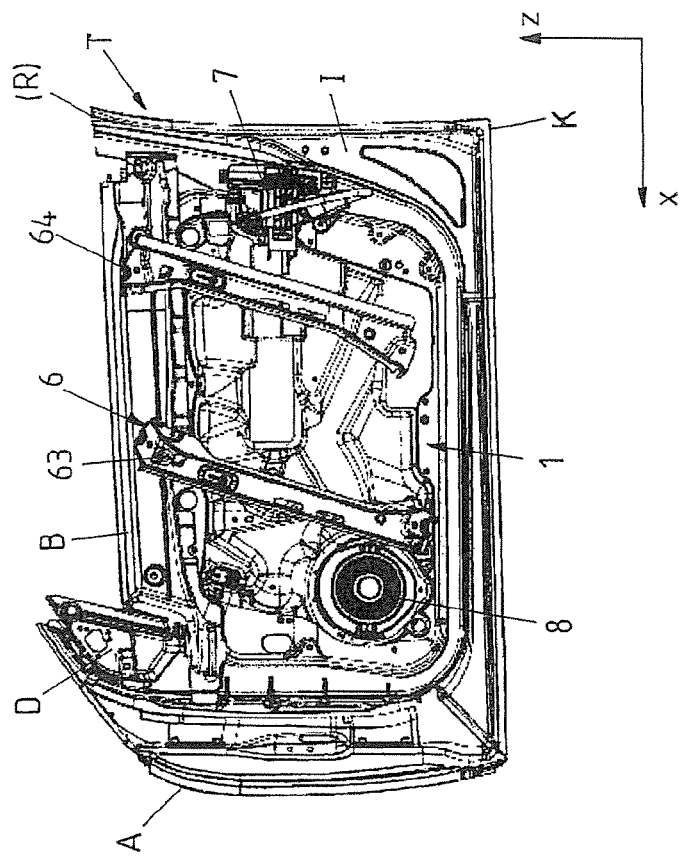
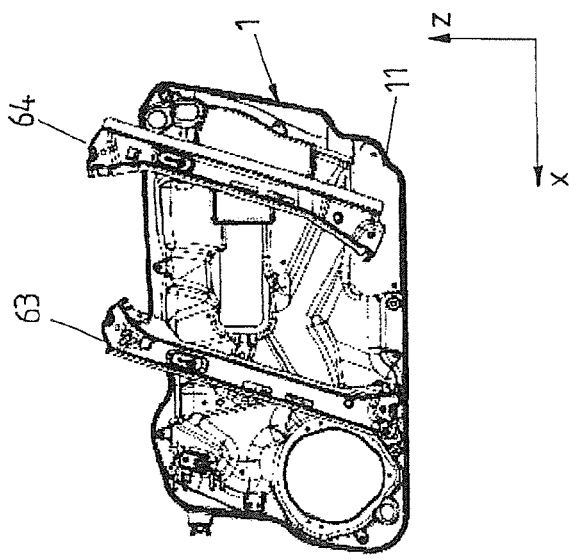

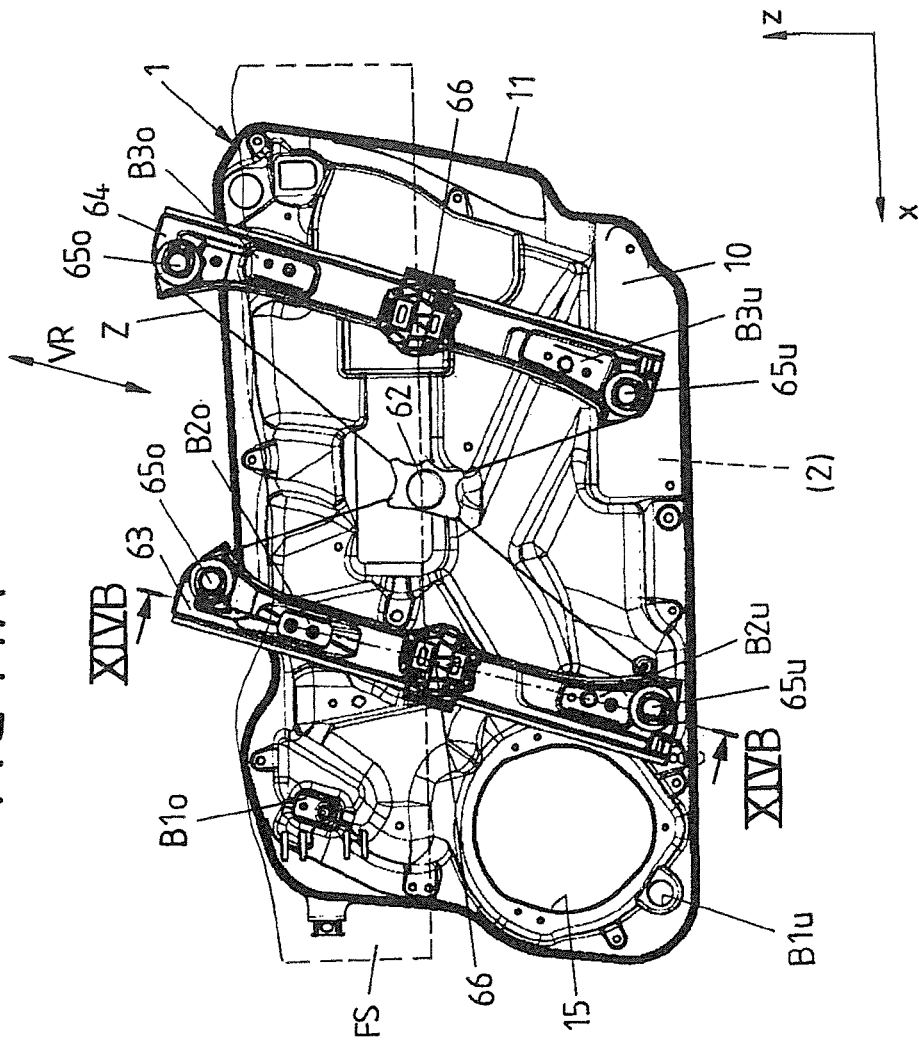

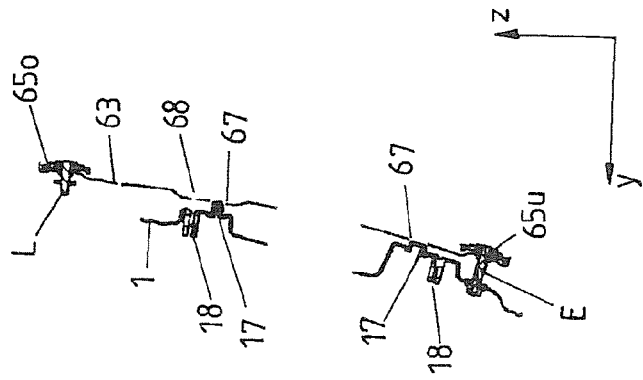
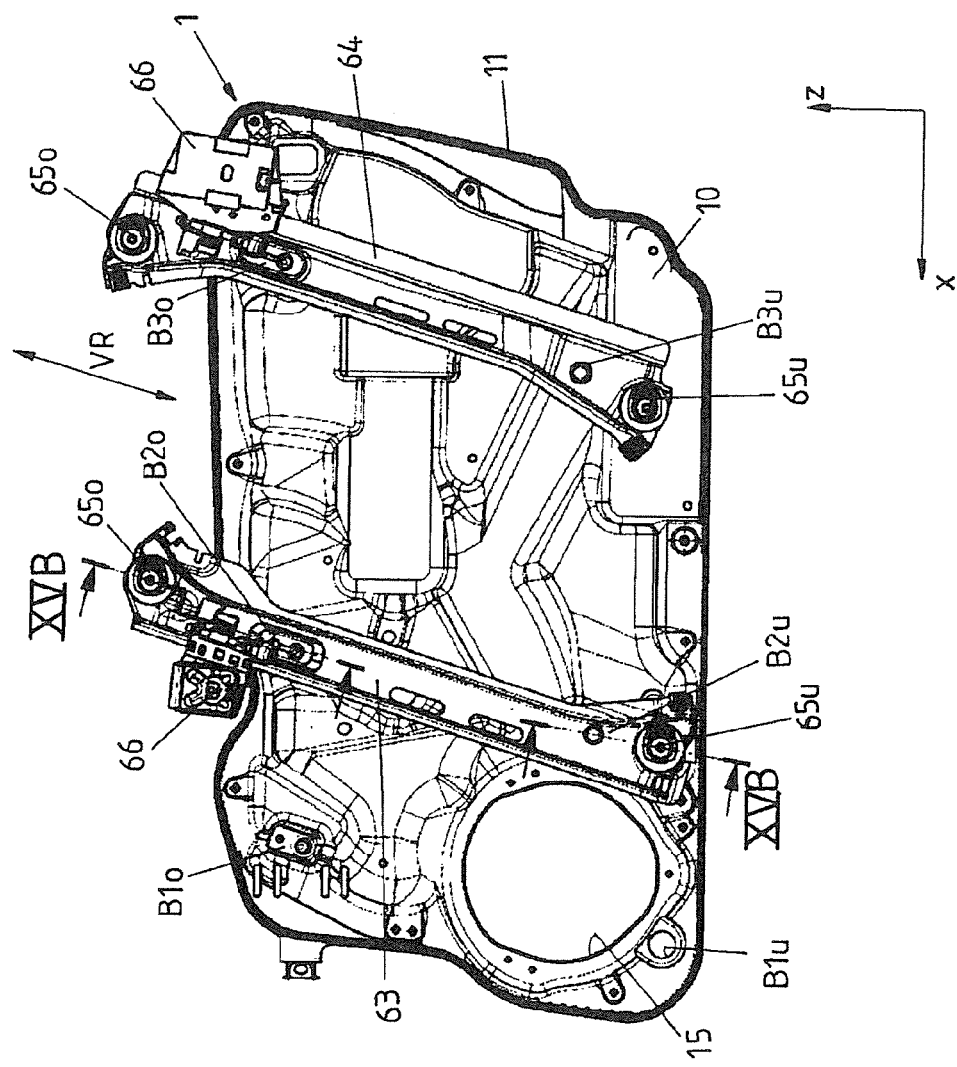

DOOR MODULE FOR INSTALLATION IN A MOTOR VEHICLE DOOR

CROSS-REFERENCE TO A RELATED APPLICATION

This application is a National Phase patent application of International Patent Application Number PCT/EP2010/052959, filed on Mar. 9, 2010, which claims priority of German Patent Application Number 10 2009 012 645.7, filed on Mar. 10, 2009 and of German Utility Model Application Number 20 2009 003 452.6, filed on Mar. 10, 2009.

BACKGROUND

The invention relates to a door module for installation in a motor vehicle door.

Such a door module comprises a door module carrier as well as a plurality of functional components of a motor vehicle door as for instance a window lifter, a door lock, a loudspeaker, an airbag module and such, which have to be preinstalled on the door module carrier before said carrier (together with the functional components pre-installed thereon) is installed into a motor vehicle door.

The door module carrier is usually (but not necessarily) designed such that it covers an extensive section of the motor vehicle door, more precise a section in its door inner skin, and seals it moisture-proof so that the door module carrier forms a part of the so called wet/drying room separation of a motor vehicle door, which separates the wet room from the drying room of the door. The wet room of a motor vehicle door is thereby to be understood as the room also called door casing, which is located between the door inner skin—completed by the door module carrier—and a door outer skin forming the outside design face of the motor vehicle door. Humidity can enter this room when operating the motor vehicle, for instance, when lowering a vertically adjustable window pane of the motor vehicle door, wherein rain drops adhere to its surface. In contrast, the drying room is located in front of the side of the door inner skin facing the vehicle passenger compartment and should be sealed against possible humidity present in the wet room of the vehicle door. The previously described sealing arrangement of a door module carrier over a large section of the door inner skin can in particular contribute to this.

When using a door module to be installed in a motor vehicle door the assembly of a motor vehicle door can be considerably simplified at the manufacturing place thereof. This is because since multiple functional components of a motor vehicle door can be combined to a construction unit and can be pre-examined if necessary also already before installation in a motor vehicle door so that subsequently all these functional components could be integrated in one single process step into the corresponding motor vehicle door by arranging and mounting the door module carrier provided for receiving said functional components at the manufacturing place of the motor vehicle door.

At present, in particular door modules are described, which comprise at least one guide rail of a window lifter as a functional component being pre-installed on the door module carrier.

SUMMARY

The object of the invention is to improve the adaptability to different installation conditions in a motor vehicle door in case of a door module of the previously mentioned kind.

According to an exemplary embodiment of the invention at least two different sets of fastening points being spaced apart from each other are provided for a guide rail of the window lifter so that this one guide rail can be fixed using the one or other sets of fastening points optionally in one of two different operating positions on the door module carrier, wherein the fastening of the guide rail on the door module carrier by means of the first fastening points provides the arrangement of the guide rail on the door module carrier in a first operating position and the fastening of the guide rail on the door module carrier using the second fastening points provides an arrangement of the guide rail on the door module carrier in a second operating position.

The operating position of the guide rail is thereby to be understood as a position of the guide rail on the door module carrier in which the guide rail is aligned and provided for guiding a window pane to be adjusted along its adjustment direction. This is in particular thereby not a so called transport or preassembly position, in which one guide rail is fixed for the purpose of a transport and/or the assembly on the door module carrier and out of which the guide rail is transferred before using the window lifter into its actual operation or functional position, in which said guide rail serves for guiding a window pane to be adjusted along its adjustment direction; rather the present case is explicitly about the arrangement of the guide rail in two different operating positions on the door module carrier, in which each of them can serve for guiding a window pane to be adjusted.

A respective set of fastening points of the door module carrier via which the one guide rail can be fixed in a operating position can comprise at least two fastening points being spaced apart from each other along the extension direction of the guide rail so that the guide rail can be fixed on two fastening points being spaced apart from each other along their extension direction in each case on the door module carrier.

The different (at least two) sets of fastening points via which the one guide rail can be fixed in different operating positions on the door module carrier are spaced apart from each other crosswise to the extension direction of the guide rail so that the guide rail can be fixed via this in different operating positions being spaced apart from each other crosswise to their extension direction on the door module carrier.

According to an exemplary embodiment the different operating positions, which can be taken by a guide rail on the door module carrier, correspond thereby essentially to a parallel displacement of the guide rail along the vehicle longitudinal axis—in respect to the installed state of the door module carrier in a motor vehicle door. This means that the guide rail comprises in its possible operating position in each case the same spatial orientation; it takes thereby solely different positions along the motor vehicle longitudinal axis.

It can also be provided on the other hand that the guide rail comprises in its different operating positions a deviating spatial orientation, in particular a different inclination in respect to the vertical vehicle axis.

If the window lifter is a so called one-stranded window lifter with only one guide rail extending along the adjustment direction of the window pane to be adjusted, wherein on said guide rail a carrier carrying the window pane is guided, then the at least two separate sets of fastening points of the door module carrier serve thereby to be able to fix this one guide rail in different operating positions on the door module carrier.

If, in contrast, the window lifter being arranged on the door module carrier is a so called multi-stranded (in particular double-stranded) window lifter with at least two guide rails extending along the adjustment direction of the window pane to be adjusted and being spaced apart from each other crosswise to their extension direction, then the at least two separate sets of fastening points serve to be able to fix one of these multiple (both) guide rails in different operating positions on the door module carrier. In case of a multi-stranded window lifter, of course, also in each case different sets of fastening points can be provided for multiple of the present guide rails in order to be able to fix a respective guide rail in different operating positions on the door module carrier.

The solution according to the invention is in particular usable for application with a so called cable window lifter, in case of which a (for instance via a cable drum) flexible pulling means coupled to an adjustment drive of the window lifter is guided via a deflector element, in particular in form of return pulleys, such that it extends with an adjustment section along a respective guide rail of the window lifter. On each of the adjustment sections of the flexible pulling means extending along an assigned guide rail of the window lifter a carrier is mounted in each case, which is displaced when operating the window lifter—by actuating the window lifter drive—by the action of the adjustment force being transferred by the flexible pulling means from the window lifter drive along the assigned guide rail, wherein the displacement direction depends on the actuating direction (rotational direction) of the window lifter drive. Hereby, a window pane being fixed on the carrier or the carriers is being carried, that means is lifted or lowered depending on the displacement direction of the respective carrier along the assigned guide rail.

According to an exemplary modification of the invention the door module carrier comprises at least one basis carrier element, which forms a component of the door module carrier, as well as at least one interface for an additional carrier element, which can be alternatively (optionally) combined with the basis carrier element for forming the door module carrier in order to vary the size of the door module carrier depending on the size of the motor vehicle door into which the door module carrier is to be installed. Thus, a construction set for forming the door module carrier is provided from which the respective required additional carrier element can be selected. This leads to a modular construction of the door module carrier itself so that said carrier can be adapted in a simple manner to different sizes and geometries of an assigned motor vehicle door.

This embodiment, is in particular provided for adapting a door module carrier to the construction and the dimension of different motor vehicle doors of a vehicle platform. On the basis of the vehicle platform four- as well as two-door motor vehicles are regularly manufactured, wherein the two-door model can be for instance a cabriolet version of the four-door model. In such a case the front doors of the two-door vehicle are usually larger than the front doors of the four-door vehicle, for instance the former once have a larger extension along the vehicle longitudinal axis.

When using the modular construction of the door module carrier according to the invention it is now not any longer required to provide an independent door module carrier for different designed vehicle doors (in particular of one and the same vehicle platform) in each case. In fact, one and the same basis carrier element of the door module carrier is used in each case for the doors of different motor vehicle models, and only an additional carrier element to be combined herewith is varied. Hereby, it is being taken into account that different door types of a vehicle platform match regularly in certain basic aspects, even though certain deviations in the size have sectionally an identical interface to a door module carrier arranged hereon. It is then possible to assign to such matching sections of two different doors of one and the same vehicle platform for instance the basic carrier element of the door module carrier, respectively, while an additional carrier element of the door module carrier is in each case provided on the different sections of different door types, wherein said additional carrier element is adapted specifically to the design of the respective door.

The at least one basis carrier element as well as the at least one assigned additional carrier element are matched to each other such that these—in respect to the status of the door module carrier being installed in a motor vehicle door—are adjacent to each other along the vehicle longitudinal axis and/or along the vertical vehicle axis in order to achieve a desired dimension of the resulting door module carrier along the vehicle longitudinal axis or along the vertical vehicle axis.

Deducting a certain overlap in the connecting area between a respective basis carrier element and an assigned additional carrier element the dimension of the resulting door module carrier along the vehicle longitudinal axis as well as along the vertical vehicle axis correspond thus in each case to the dimension of the at least one basis carrier element along said direction as well as the dimension of possible additional carrier elements being adjacent thereto along the respective spatial direction.

Thereby it can be in particular be provided that the at least one basis carrier element as well as an additional carrier element to be arranged hereon form together a plate-like door module carrier. On the other hand, a respective additional carrier element can also only locally project from the assigned basis carrier element.

In so far as the resulting door module carrier serves for sealing a large section or optionally multiple sections of a motor vehicle door, in particular in the door inner skin thereof, a sealing can revolve along the outer circumference of the door module carrier resulting from the assembly of the at least one basis carrier element and optionally at least one additional carrier element to be arranged hereon, wherein via said sealing the door module carrier abuts (humidity-tight) to the door inner skin of a motor vehicle door.

In order to form different door module carriers from at least one basis carrier element as well as at least one additional carrier element it can be for instance provided that a basis carrier element is combined in each case with different large additional carrier elements. Thereby, the basis carrier element can, already when taken separately, form a complete door module carrier, which is used in a comparatively small motor vehicle door. If an accordingly larger motor vehicle door is used then the basis carrier element is combined with at least one assigned additional carrier element.

Furthermore, multiple, for instance two basis carrier elements can also be provided, which are used in each door module carrier to be formed from one assembly set, wherein these (multiple) basis carrier elements are to be combined in each case with different additional carrier elements. For instance, a door module carrier can be directly formed out of two basis carrier elements being adjacent to each other, while a further door module carrier is formed by receiving an additional carrier element between the two basis two basis carrier elements.

The connection of the singular carrier elements (basis carrier elements and additional carrier elements) out of which a respective door module carrier is formed can occur in different manner; for this reason a number of joining technologies can be considered. Thus, a form fitted connection between the carrier elements can be provided, for instance in form of a plug connection and/or a latching or clipping connection.

Furthermore, friction locked joining technologies can be used as for instance rivets or screws. Also firmly bonded joining technologies can be applied as for instance welding, adhesion or hot caulking. Finally, singular carrier elements of the door module carrier can also be integrally formed to one another, for instance, when forming by (injection) moulding.

Furthermore, a combination of the mentioned joining technologies can be used, in particular a combination of a form-fitted connection (plug connection) of carrier elements being adjacent to each other with additional joining technologies. Here, the plug connection provides a defined engagement and a defined positioning of the carrier elements being assigned to each other; and additional form fit, friction locked or firmly bonded joining measures as for instance latching, riveting, screwing, welding or hot caulking guarantee then a tight connection between the carrier elements.

A suitable plug connection can be for instance realized via plug pins and assigned plug openings and via (comb-like) projections and recesses (according to the type of a toothing) engaging with each other.

In particular, if the door module carrier to be formed of singular carrier elements forms a component of a wet/drying room separation of a motor vehicle door, the connection between the singular carrier elements of the door module carrier has to be designed preferably moisture-tightly sealed so that no additional sealing measures are required.

If the carrier elements of the door module carrier are made by moulding, in particular injection moulding, for instance in case of a door module carrier consisting of plastic, then for instance the following possibilities for the manufacturing of the singular carrier elements of the door module carrier exist: on the one hand, the singular carrier elements can be produced separately in the respective own tools and can be subsequently connected to each other in a suitable manner for forming a door module carrier. On the other hand, also interchangeable inserts of a tool can be used in order to produce different combinations of carrier elements in this one tool, which are subsequently assembled to one door module carrier. It is finally also possible, in particular when using interchangeable inserts of a tool, to form the different carrier elements to one another immediately during injection moulding in order to form thereby a door module carrier.

BRIEF DESCRIPTION OF THE DRAWINGS

Further details and advantages of the invention are becoming apparent by the following description of the embodiments by the means of the Figures.

FIG. 1A shows a lateral view of a door structure of a motor vehicle door as well as a door module to be arranged on the door structure.

FIG. 1B shows a modification of the arrangement of FIG. 1A in respect to the design of the door structure as well as the assigned door module.

FIG. 2A shows a lateral view of a basis carrier element of a one-piece door module carrier, which can be supplemented by an additional carrier element.

FIG. 2B shows the door module carrier of FIG. 2A together with a door structure, into which the door module carrier can be installed.

FIG. 3A shows a lateral view of the door structure of a motor vehicle door as well as of a door module carrier to be arranged on the door structure and consisting of two carrier elements with functional components pre-assembled hereon.

FIG. 3B shows a modification of the arrangement of FIG. 3A in respect to the design of the door structure as well as the assigned door module.

FIG. 4A shows a schematic illustration of multiple singular tools for producing one carrier element of a door module carrier for using in an arrangement of the FIGS. 3A and 3B.

FIG. 4B shows a schematic illustration of unified tools for producing a door module carrier consisting of multiple carrier elements for use in an arrangement of FIGS. 3A and 3B.

FIG. 5A shows a lateral view of a door structure of a motor vehicle door as well as of a door module carrier to be arranged on the door structure and consisting of two carrier elements the functional components pre-assemble hereon.

FIG. 5B shows a modification of the arrangement of FIG. 5A in respect to the design of the door structure as well as the assigned door module.

FIG. 6A shows a schematic illustration of multiple singular tools for producing each one carrier element of a door module carrier for use in an arrangement of FIGS. 5A and 5B.

FIG. 6B shows a schematic illustration of unified tools for producing a door module carrier consisting of multiple carrier elements for use in an arrangement of the FIGS. 5A and 5B.

FIG. 7A shows a lateral view of a two-piece door module carrier of a basis and an additional carrier element.

FIG. 7B shows the door module carrier of FIG. 7A together with the structure into which the door module carrier can be installed.

FIG. 8A shows a lateral view of an additional two-piece door module carrier of a basis and an additional carrier element FIG. 8B shows the door module carrier of FIG. 8A together with a door structure into which the door module carrier can be installed.

FIG. 8C shows the door module carrier of FIG. 8B after loading the functional components of a motor vehicle door.

FIG. 8D shows the door module carrier of FIG. 8C together with the functional components pre-assembled hereon and being installed in a door structure according to FIG. 8B.

FIG. 12A shows a first possibility for arranging two guide rails on the door module carrier of FIG. 11A.

FIG. 12B shows the door module carrier of FIG. 12A installed in a door structure.

FIG. 15A shows a further detailed view of a door module carrier with two guide rails mounted hereon.

FIG. 15B shows a section through the door module carrier of FIG. 15A in the area of the guide rail.

DETAILED DESCRIPTION

Figure 1C:
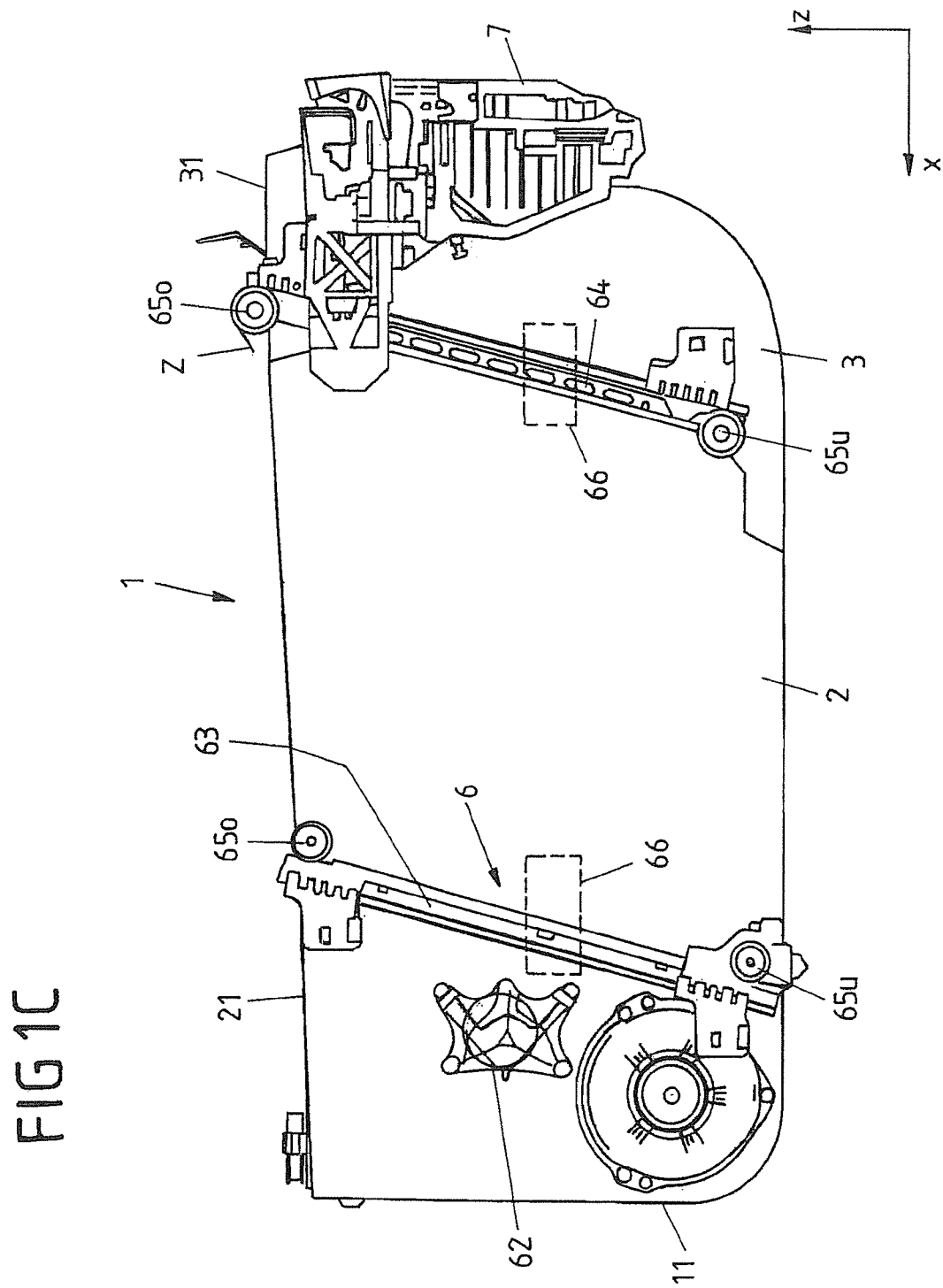
FIG. 1C shows a rear view of the door module of FIG. 1B.
Figure 2D:
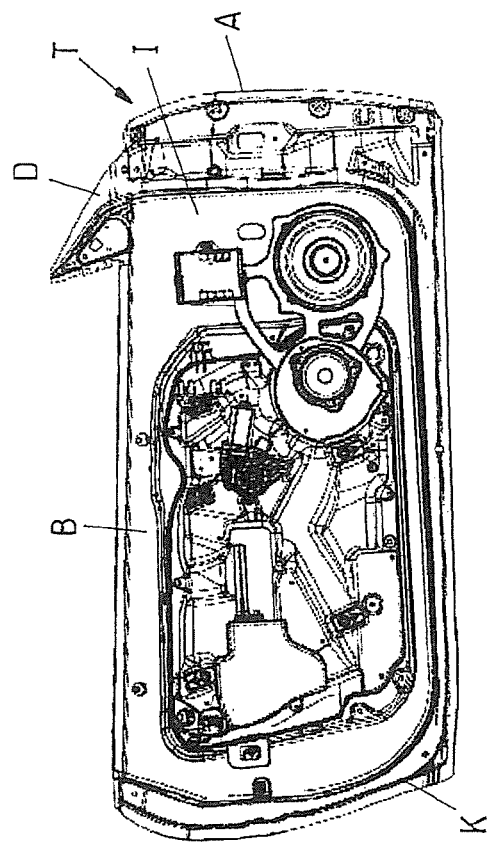
FIG. 2D shows the door module carrier of FIG. 2C together with the functional components being pre-assembled hereon and being installed in a door structure according to FIG. 2B.
Figure 2C:
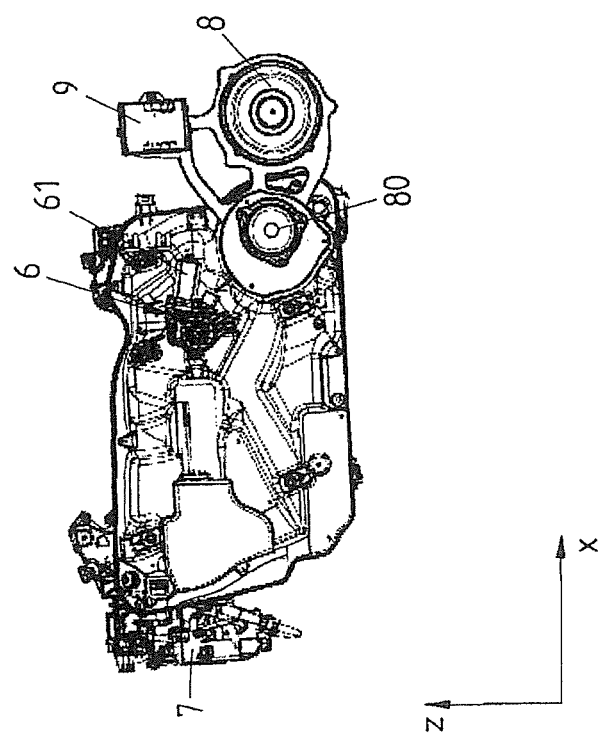
FIG. 2C shows the door module carrier of FIG. 2B after loading the functional components of a motor vehicle door.

FIG. 1a shows a door structure T of a motor vehicle door which comprises a door box K as well as a window frame R being arranged—along the vertical vehicle axis z—above the door box K, and namely if looked at in a lateral view from the vehicle passenger compartment—in respect to the status of the door being installed in a motor vehicle.

The door box K is being formed in a known manner by a door outer skin A defining the outer design face of a motor vehicle door, which is recognizable in FIG. 1A only to some extend, since said skin is located at the side of the door structure facing away from the vehicle passenger compartment, as well as via a door inner skin I being provided with a large section O, which is located on the side of the door structure facing towards the vehicle passenger compartment. The door outer skin A and the door inner skin I are connected in a known manner via stiffening elements, for instance in form of a so-called stiffening frame, compare DE 10 2005 013 201 A1.

A space also designated as door casing is formed between the door outer skin A and the door inner skin I, which is the so called wet room of the vehicle door.

The door box K is delimited—if looked at along the vertical vehicle axis z—upwards by the so called door trims B, which extend essentially along the vehicle longitudinal axis x and at hand a window frame R is adjacent upwards to said door trims, wherein said window frame encloses a window opening F.

The window opening F is closed by the means of a window pane, which can be lowered by a window lifter along the vertical vehicle axis z in order to release the window opening F. Hereby, the window pane is lowered into the door casing or wet room of the vehicle door defined by the door box K. During such lowering of the window pane liquid drops, for instance rain drops, adhering hereon, are carried into the door casing or wet room so that humidity can be formed there.

In order to avoid an entry of the humidity being in the wet room of the vehicle door into the vehicle passenger compartment the door inner skin I has to be designed such that it separates moisture tightly sealed the wet room of the vehicle door located between the door outer skin and door inner skin from the drying room of the motor vehicle. At hand the large section O formed in the door inner skin I is thus to be closed moisture tightly sealed by the means of a door module carrier 1. The door module carrier 1 can herefore for instance rest against the door inner skin I via a sealing extending along its peripheral outer edge 11 such that the door module carrier 1 completely covers the large section O of the door inner skin I and thereby simultaneously rests against the door inner skin I moisture tightly sealed via the mentioned sealing, compare DE 196 22 310 A1 and DE 196 54 956 A1.

The door module carrier 1 is illustrated in FIG. 1A separately from the door structure T; said door module carrier can be produced independently on said door structure T and can be subsequently arranged and mounted on the door structure together with the functional components 6, 7, 8 of a motor vehicle door pre-assembled hereon, wherein said carrier—as described—can cover and close the large section A of the door inner skin I.

The door module carrier 1 can consist for instance of plastic or metal and is loaded with functional components 6, 7, 8 before its assembly into the door structure T so that the door module carrier 1 and the functional components 6, 7, 8 pre-assembled hereon form a pre-fabricated and optionally pre-testable door module, which can be integrated into the door structure T. This allows the possibility to assemble a multitude of functional components of a motor vehicle door independent on the manufacturing place of the door structure T and to test them in respect to their function before they are integrated subsequently in one working step together into the door structure T by arranging and mounting the door module carrier 1 together with the functional components 6, 7, 8 pre-assembled hereon to the door structure T, more precisely its door inner skin I. In FIG. 1A the side of the door module carrier 1 is thereby shown which faces the vehicle passenger compartment, thus the drying room.

The functional components pre-assembled on the door module carrier 1 comprise in the embodiment of FIG. 1A the window lifter 6, of which in FIG. 1A a window lifter drive 61 as well as a guide rail 63 are recognizable, and furthermore a door lock 7 as well as a loudspeaker 8. Besides these functional components exemplary shown in FIG. 1A further elements as for instance an airbag module, an (optional height adjustable) arm support, cable harness and so on can be pre-assembled on the door module carrier 1.

The door module carrier 1 is formed in embodiment of FIG. 1A by a singular basis carrier element 2, which is designed plate-like and which completely covers and closes the large section O being in the door inner skin I when arranging said element on the door structure T, more precise on its door inner skin I.

FIG. 1B shows a door structure T, which differs from the door structure illustrated in FIG. 1A on the one hand in that it is at hand a so called frameless motor vehicle door, which does not comprise a window frame above the door trim B. Accordingly, only a mirror triangle D is located above the door trim B in case of the door structure T of the FIG. 1B. Furthermore, the door structure illustrated in FIG. 1B has in vehicle longitudinal direction x a larger extension than the one shown in FIG. 1A.

The door structure T of FIG. 1B can thus be for instance a door structure of a two-door cabriolet variant of a motor vehicle, which is based on the same platform as the motor vehicle for which the door structure T of a front door is illustrated in FIG. 1A. For instance, the door structure shown in FIG. 1A can illustrate a front door of a four door limousine of a specific vehicle platform, while FIG. 1B relates to the two-door cabriolet or coupe variant of the corresponding vehicle type.

Thereby, the two-door variants of a specific vehicle type are characterized usually in that their doors have a larger extension in vehicle longitudinal direction x than the front doors of the corresponding four-door vehicles.

Due to their larger extension along the vehicle longitudinal axis x the door structure T illustrated in FIG. 1B has also a corresponding larger extension of its large section O along said direction x, which is accordingly covered by an accordingly larger door module carrier 1.

The accordingly larger door module carrier 1 is formed in the embodiment of FIG. 1B by a basis carrier element 2, which is identical to the basis carrier element 2, which forms the complete door module carrier 1 of FIG. 1A, and furthermore by an additional carrier element 3, which is attached to the basis carrier element 2 such that it is adjacent hereto along the vehicle longitudinal axis x. Accordingly, the door module carrier 1 of FIG. 1B has along the vehicle longitudinal axis x an extension which is larger by the corresponding extension of the additional carrier element 2 than the extension of the door module carrier 1 of FIG. 1A.

The embodiments of FIGS. 1A and 1B are based therefore on an assembly kit for a modular constructed door module carrier 1 consisting of at least one basis carrier element 2 and at least one additional carrier element 3, wherein the basis carrier element 2 is used in each of the two different door module carriers of FIGS. 1A and 1B, while the additional carrier element 3 is used as an optional carrier element only in a door module carrier 1 of FIG. 1B, thus for the two-door model with accordingly longer door structure T.

The basis carrier element 2 and the additional carrier element 3 can be seen as components of an assembly kit for production of a door module carrier 1 in which the basis carrier element 2 forms a mandatory component of each door module carrier produced with this assembly kit and in which the additional carrier element 3 is only used optionally for forming an accordingly larger door module carrier.

The connection of the additional carrier element 3 to the basis carrier element 2 for forming the accordingly larger door module carrier 1 of FIG. 1B along a connecting area V provided therefore can occur in different ways, as will be explained further below by the means of additional embodiments.

A form-fitted connection between the two carrier elements 2, 3 for instance by means of a plug connection is in particular practical so that the two carrier elements 2, 3 can be positioned in a defined manner to each other simply be sticking together. For a lasting fixation of the two carrier elements 2, 3 to one another then additional joining technologies can be used as for instance a latching or clipping connection, which is preferably combinable with a plug connection in a manner that when plugging the two carrier elements 2, 3 also a latching or clipping connection between the two carrier elements 2, 3 is provided at the same time. However, further form-fitted or friction-locked joining technologies as for instance rivets or screws as well as firmly bonded connecting technologies as for instance gluing, welding or hot caulking can be used.

When producing the two carrier elements 2, 3 by moulding, in particular injection moulding, then it can be furthermore provided to form the additional carrier element 3 in one piece on the basis carrier element 2.

As furthermore apparent by the means of FIG. 1B the two carrier elements 2, 3 that means the basis carrier element 2 and the additional carrier element 3 are joint to each other such that they form in the assembled state a unified carrier plate with an circumferential outer edge 11, which is partially formed by the outer edge 21 of the basis carrier element 2 and partially by the outer edge 31 of the additional carrier element 3. In the transition area from basis carrier element 2 to additional carrier element 3 there is thereby a steady gradient of the outer edge 11 that means the outer edge 21 of the basis carrier element 2 passes continuously there into the outer edge 31 of the additional carrier element 3. In particular, in the transition area from basis carrier element 2 to the additional carrier element 3 the extension a of the resulting door module carrier 1 is essentially constant crosswise to the transition direction R that means at hand to the extension of the door module carrier 1 along the vertical vehicle axis z.

That means that in the transition area of basis carrier element 2 to additional carrier element 3 the extension a of the resulting door module carrier 1 does not make a jump crosswise to the transition direction R, that means at hand the extension a along the vertical vehicle axis z; rather the said extension a changes at the most steady at the transition from basis carrier element 2 to additional carrier element 3. If one looks at infinitesimal spaced positions along the transition direction R from basis carrier element 2 to the additional carrier element 3, then accordingly at most small changes in the extension a crosswise to the transition direction R occur between said elements and not jump-like changes of the extension a.

The mounting of the enlarged door module carrier 1 consisting of the basis carrier element 2 and the additional carrier element 3 with the functional component 6, 7, 8 of a motor vehicle door is in particular apparent by the means of a combination of FIGS. 1B and 1C, wherein the door module carrier 1 being separate from the door structure T is illustrated in FIG. 1B in a lateral view from the vehicle passenger compartment and in FIG. 1C in a lateral view from the side facing away from the vehicle passenger compartment. In particular, by the means of the rear view of FIG. 1C further details of the construction of the window lifter 6 are recognizable—compared to FIGS. 1A and 1B.

The window lifter 6 is here designed as a double-stranded window lifter with two guide rails 63, 64 being spaced apart from each other along the vehicle longitudinal axis x for guiding in each case a carrier along the adjustment direction of a window pane to be adjusted by the means of the window lifter; appropriate carriers 66 are indicated in FIG. 1C schematically in a dash-dot line. In the upper and lower end area of each of the two guide rails 63, 64 in each case an upper or lower deflector element 65o, 65u, here in form of a respective return pulley, are provided by the means of which a flexible pulling means Z of the window lifter, which is only sectionally indicated in FIG. 1C, can be deflected such that it extends in the area of the guide rails 63, 64 in each case along the respective guide rail 63 or 64. The pulling means Z serves to move a carrier 66 being guided on the respective guide rail 63 or 64 in each case along the extension direction of the guide rail 63 or 64 in order to adjust thereby a window pane being fixed in a known manner to the carriers, compare DE 196 19 087 A1.

A window lifter drive 61, here in form of an electromotive drive, serves for actuating the flexible pulling means Z in order to introduce over this an adjustment force into the carriers 66 being guided on the guide rails 63, 64, wherein said drive is arranged according to FIG. 1B on the side facing the vehicle passenger compartment, thus on the drying room side surface of the door module carrier 1. The adjusting moment generated by the drive 61 is transferred via a motor control gear, which comprises an output shaft reaching through the door module carrier 1, to an adjustment gear 62 being arranged before the side facing away from the vehicle passenger compartment, thus on the wet room side surface of the door module carrier 1, wherein said adjustment gear drives in a known manner a cable drum being wrapped by the flexible pulling means Z.

The two guide rails 63, 64 of the window lifter 6 are likewise as the adjustment gear 62 arranged together with the carriers 66 guided hereon on the wet room side surface of the door module carrier 1 in order to be able to lower herewith the window pane to be adjusted into the door casing, thus the wet room of the motor vehicle door.

As becomes apparent, when comparing the door module carrier 1 illustrated in FIGS. 1B and 1C with the door module carrier illustrated in FIG. 1A the second—along the vehicle longitudinal axis x rearmost—guide rail 64 as well as the door lock 7 are arranged now on the additional carrier element 3 in case of the door module carrier 1 of the FIGS. 1B and 1C, whereas they are arranged in the embodiment of FIG. 1A together with all other functional components assigned to the door module of the vehicle door on the basis carrier element 2.

Furthermore, a comparison of FIGS. 1A, 1B shows that in latter case the lock constructional unit 7 is attached on the door module carrier 1 with a somewhat other orientation (inclination) as in case of FIG. 1A.

Since the door module carrier 1 of the embodiment of FIG. 1A and the door module carrier 1 of the embodiment of the FIGS. 1B and 1C match in each case in the basis carrier element 2, an identical interface design can be used on the corresponding interfaces of the door structure T via which the basis carrier element 1 is attached to the door inner skin I, as is practical with vehicles of a unified platform.

At hand the basis carrier element 2 forms in the embodiment of FIGS. 1B and 1C—if looked at in vehicle longitudinal direction x—the front and middle part of the door module carrier 1 to which backwards the additional carrier element 3 is adjacent. Accordingly, in case of the arrangement of FIG. 1A on the one hand and in case of the arrangement in FIGS. 1B and 1C on the other hand, an identical interface to the respective door module carrier 1 can be used in the front part of the respective door structure T. Alternatively, the basis carrier element 2 can of course form also the rearmost part of the door module carrier 1 being supplemented by an additional carrier element 3.

A modification of the arrangements from FIGS. 1A to 1C is illustrated in FIGS. 2A to 2D according to which for adapting a door module carrier 1 to a vehicle door enlarged in vehicle longitudinal direction x, for instance in form of a frameless door structure T of a cabriolet vehicle, a basis carrier element 2 is combined with an additional carrier element 3', which is designed geometrically such that it does not form together with the basis carrier element 2 a unified carrier plate with steady circumferential outer edge. Rather, the extension a of the resulting door module carrier 1 jumps in the transition area from the basis carrier element 2 to the additional carrier element 3'; that means the extension a is reduced jump-like (unsteady) during transition from basis carrier element 2 to additional carrier element 3.

The additional carrier element 3' comprises a connecting section 35 via which it will be connected to the basis carrier element 2. The connecting section 35 serves thereby simultaneously for closing a loudspeaker opening 25 of the basis carrier element 2.

The loudspeaker 8 provided in said loudspeaker opening 25 in case of the comparable shorter version of the motor vehicle door (for which only the door module carrier forms the basis carrier element 2), for instance in form of a woofer, is now housed in a loudspeaker opening 36 of the additional carrier element 3'. A further loudspeaker 80, for instance in form of a midrange driver, can be instead assigned to the loudspeaker opening 25 of the basis carrier element 2. The additional carrier element 37 comprises furthermore a supporting section 37 for receiving a door control drive 9.

A further difference between the embodiment of the FIGS. 2A to 2D and the arrangements of the FIGS. 1A to 1C is that at present the resulting door module carrier 1 does not only cover—as in case of FIGS. 1B and 1C—one singular large section O of the door inner skin I (and namely together by the basis carrier element and the additional carrier element), but rather that here the basis carrier element 2 on the one hand and the additional carrier element 3' on the other hand cover in each case a section O, O' in the door inner skin and seal them tightly.

In FIGS. 3A and 3B a modification of the arrangements from FIGS. 1A to 1C is illustrated according to which for adapting a door module carrier 1 to a respective door structure T, in particular, on the basis of a unified vehicle platform, a basis carrier element 2 is optionally combined with a first additional carrier element 3a or a second additional carrier element 3b, which differ in particular in their extension along the vehicle longitudinal axis x—in respect to the installed status into the respectively assigned door structure T.

Thus, at hand the assembly kit, out of which the respective resulting door module 1 is manufactured, is formed by a basis carrier element 2 as well as two additional carrier elements 3a, 3b of which in each case optionally the one or the other is combined with the basis carrier element 2 in order to provide a door module 1 adapted to the respective door structure T.

In accordance with the arrangements of FIGS. 1A to 1C the resulting door module carrier 1 is thereby formed in each case by a carrier plate, which comprises a steady circumferential outer edge 11 formed by the outer edges 21, 31 of the two respective carrier elements 2, 3a or 2, 3b. In the connecting area V between the basis carrier element 2 and the respective additional carrier element 3a or 3b there is in particular a steady transition provided—without a jump in the extension a vertical to the transfer direction R.

In case of the basis carrier element 2 and the additional carrier element 3a, 3b in each case in particular a plastic component can be used, which are made in a simple manner by moulding (injection moulding). The three carrier elements 2, 3a, 3b can thereby according to FIG. 4A be made in each case separately with an particular moulding tool W1, W2 or W3, thus a particular moulding form. Alternatively, it can be provided according to FIG. 4B that basis carrier element and the respective assigned additional carrier element 3a or 3b are made in a moulding tool W with a uniform moulding form, wherein the respective moulding form is adapted by using changeable inserts E2 or E3 to the respective additional carrier element 3a or 3b. The insert E1 to be used for the basis carrier element 2 remains thereby unchanged.

In the latter mentioned case, the respective additional carrier element 3a or 3b is formed in each case during moulding injection in one piece on the assigned basis carrier element 2. In case of FIG. 4A a subsequent connection of the respective additional carrier element 3a or 3b to the basis carrier element 2 occurs in contrast after the manufacturing of the carrier elements 2, 3a, 3b by moulding injection, as will be explained further below by the means of an additional embodiment.

According to FIGS. 5A and 5B a door module carrier 1 being adaptable to different door structures T comprises two basis carrier elements 2a, 2b, which form a mandatory component of the respective door module carrier 1, as well as an additional carrier element 3, which can be optionally connected to the two basis carrier elements 2a, 2b, namely by insertion between the two basis carrier elements 2a, 2b, which are adjacent to each other along the vehicle longitudinal axis x so that through this the extension of the door module carrier along the vehicle longitudinal axis x can be enlarged according to the transition of the arrangement of FIG. 5A to the arrangement of FIG. 5B.

In this case the assembly set, out of which the different resulting door module carriers 1 can be formed, consists of two basis carrier elements 2a, 2b and an additional carrier element 3, wherein the two basis carrier elements 2a, 2b are used in each resulting door module carrier 1 and the additional carrier element 3 is only optionally used in order to adapt the door module carrier 1 to a door structure being elongated in vehicle longitudinal axis x with an accordingly larger section O, compare the different geometry of the door structures T of FIG. 5A on the one hand and FIG. 5B on the other hand.

The singular carrier elements 2a, 2b, 3 can here also be made on the one hand with separate moulding tools W1, W2, W3 as shown in FIG. 6A; or a unified moulding tool W can be provided according to FIG. 6B which comprises as basic components the inserts E1, E2 for the two basis carrier elements 2a, 2b and into which a third insert E3 for the additional carrier element 3 can be optionally inserted between said two inserts E1, E2.

FIGS. 7A and 7B show in resemblance to FIG. 3A a module carrier 1 provided for installation in a door structure T, which consists of an basis carrier element 2 and an additional carrier element 3a, wherein here additionally connecting means 22, 32 in form of plug pins 22 and plug openings 32 are illustrated via which the basis carrier element 2 can be connected to the additional carrier element 3 by the means of a plug connection.

The connection of basis carrier element 2 and additional carrier element 3a occurs in a connecting area V by plugging the two carrier elements 2, 3a together along a joining direction which matches—in respect to the installed status in a door structure T—to the vehicle longitudinal axis x. In the assembled status shown in FIG. 7B, the additional carrier element 3a is at hand adjacent to the basis carrier element 2 along the vehicle longitudinal axis x so that the complete extension of the resulting door module carrier 1 along the vehicle longitudinal axis x is provided by the sum of the extensions of the basis carrier element 2 and the additional carrier element 3a along said direction x.

Figure 7D:
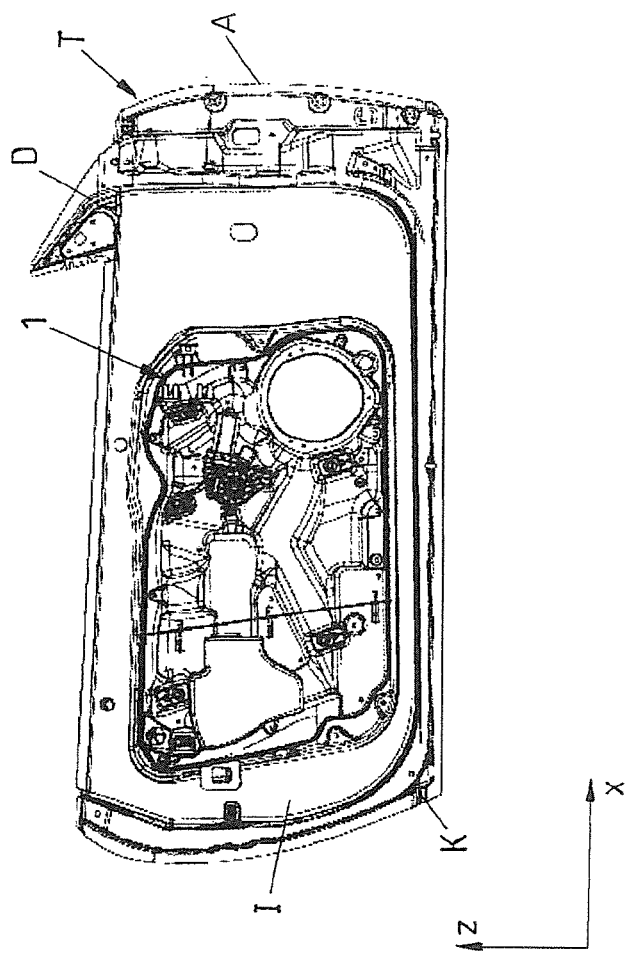
FIG. 7D shows the door module carrier of FIG. 7C together with the functional components pre-assembled hereon and being installed in a door structure according to FIG. 7B.
Figure 7C:
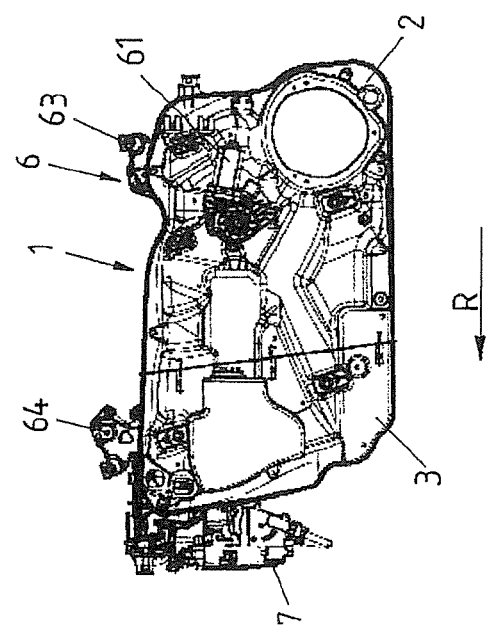
FIG. 7C shows the door module carrier of FIG. 7B after loading the functional components of a motor vehicle door.

FIG. 7C shows the resulting door module carrier 1 together with the functional components pre-mounted hereon as for instance a drive 61 and guide rails 63, 64 of a window lifter 6 and a lock assemble group 7.

The door module consisting of the door module carrier 1 and the functional components 6, 7 pre-assembled hereon is installed in a door structure T so that it covers its large section O (compare FIG. 8B) and contributes as a component of the door inner skin I for wet/drying room separation, as can be seen in FIG. 7D.

FIGS. 8A to 8D show an arrangement corresponding to FIGS. 7A to 7D, wherein here instead of the additional carrier element 3a of FIGS. 7A to 7D an additional carrier element 3b with a larger extension along the vehicle longitudinal axis x is used, comparable to the transition of the arrangement according to FIG. 3A to the arrangement according to FIG. 3B. Through this, the resulting module carrier is adapted to a larger extension of a door structure T and in particular to the large section O of the door structure T to be covered by the module carrier 1.

Figure 9A:
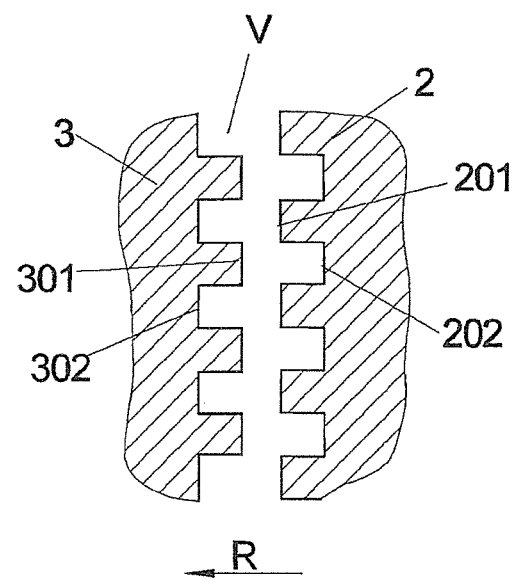
FIG. 9A shows an embodiment of the connecting area between a basis carrier element and an additional carrier element of a door module carrier.

FIG. 9A shows a further embodiment for the modification of a connecting area V between the basis carrier element 2 and an additional carrier element 3 on the basis of a form-fitted connection. For this (comb-like or tooth-like) form-fitted areas 201, 202 or 301, 302 are formed in each case on edge sections of the basis carrier element 2 on the one hand and of the additional carrier element 3 on the other hand assigned to each other, wherein said form-fitted area consist of a multitude of (tooth-like) projections 201 or 301 and recesses or clearances 202 or 302 located between them. The two form-fitted areas 201, 202; 301, 302 are brought into engagement with each other along the joining or transfer direction R for establishing a form-fitted connection (plug connection) between the basis carrier element 2 and the additional carrier element 3 so that the respective projections 201, 301 engage in the assigned recesses 302, 202. The two carrier elements 2, 3 are positioned to each other in a defined manner by such a plug connection.

Additional joining techniques can be used for a lasting fixation for instance by designing the plug connection as a self-latching connection using appropriate latch or clip elements. Furthermore, the two-sided form-fitted areas can be held tightly to each other by gluing, welding or melting/hot caulking of the form-fitted areas.

Additional mounting elements as for instance screws or rivets can also be used in order to keep the two carrier elements 2, 3 in their plugged-together position.

Figure 9B:
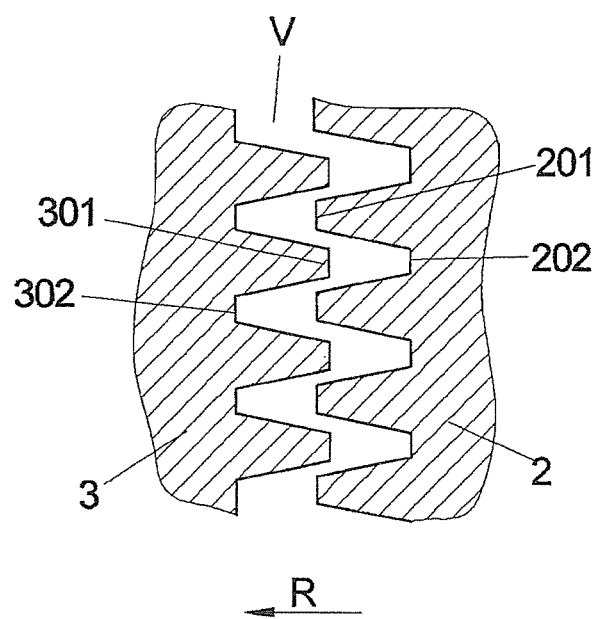
FIG. 9B shows a modification of the connecting area of FIG. 9A.

FIG. 9B shows a modification of the plug connection of FIG. 9A, wherein here the plug elements 201, 202, or 301, 301, thus the respective projections 201, 301 and recesses 202, 302 comprise in each case a larger extension (length) along the joining direction R. Through this the bending stiffness of the connection can be improved.

In particular, if the resulting door module carrier 1 forms a component of a wet/drying room separation of a motor vehicle door, the connection between the carrier elements 2, 3 is to be provided such that it is moisture-tight, at least tight-sealed, but at least splash-proof sealed.

Figure 10A:
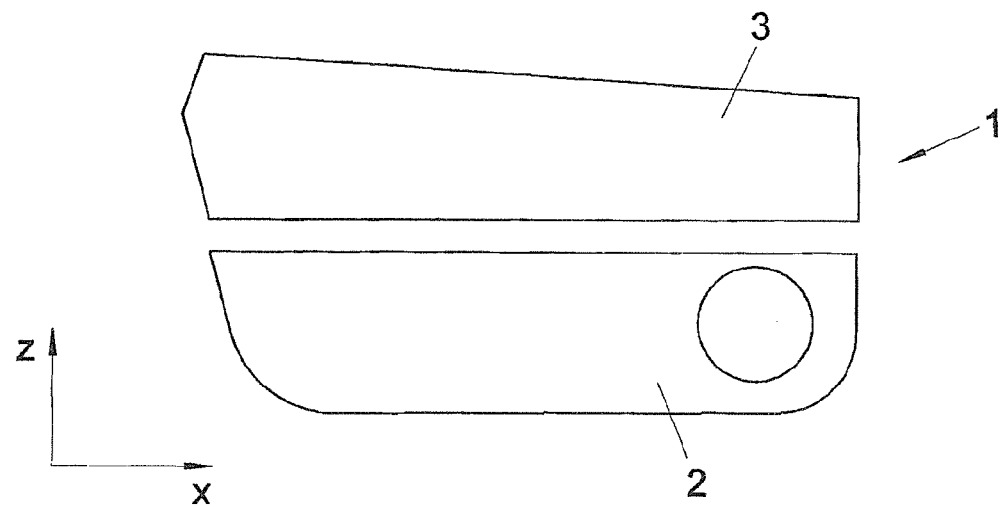
FIG. 10A shows a schematic illustration of further combination possibilities of a basis carrier element with an additional carrier element for forming a door module carrier.

As becomes apparent by the means of FIG. 10A a basis carrier element 2 and an additional carrier element 3 do not have to be necessarily arranged one after another along the vehicle longitudinal axis x for forming a resulting door module carrier 1 in order to be able to variably design the extension of the door module carrier 1 along said direction x; rather the basis carrier element 2 and an additional carrier element 3 can also be adjacent to each other along the vertical vehicle axis z (being arranged one after another) in order to allow along this direction z a variable extension of the door module carrier 1, depending on if or which additional carrier element is used.

Figure 10B:
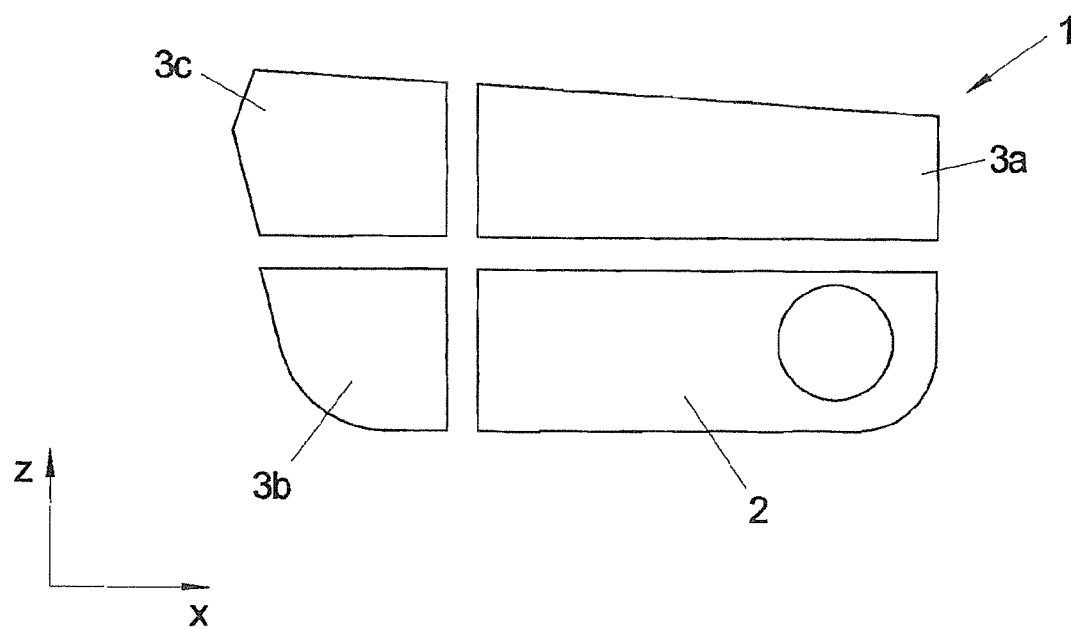
FIG. 10B shows a modification of the arrangement of FIG. 9A.

A basis carrier element 2 and additional carrier elements 3a, 3b, 3c can be finally combined according to FIG. 10B such that the extension of the resulting door module carrier 1 along the vehicle longitudinal axis x as well as also along the vertical vehicle axis z can be variably adapted to different door structures and their large sections.

As already been explained by the means of FIGS. 1A to 1C the variable design of a door module carrier 1 using at least one basis carrier element 2 as well as at least one additional carrier element 3 allows in particular also the possibility to position the functional components to be arranged on the resulting door module carrier 1 in different positions on the door module carrier 1. Thus, in case of the arrangements of FIGS. 1A to 1C the second guide rail 64 being in the rear end in vehicle longitudinal direction x is arranged in case illustrated in FIG. 1A, in which the door module carrier 1 consists only of the basis carrier element 2, on said basis carrier element 2 as all other functional components of the vehicle door. When designing the door module carrier 1 according to FIGS. 1B and 1C, wherein said carrier consists of the basis carrier element 2 and the additional carrier element 3 being adjacent hereto along the vehicle longitudinal direction x, the said second guide rail 64 is arranged in contrast on the additional carrier element 3. Since the additional carrier element 3 is adjacent to the basis carrier element 2 along the vehicle longitudinal axis x, in means that the second guide rail 64 is arranged when designing the resulting door module according to the FIGS. 1B and 1C—compared to the design according to FIG. 1A—along the vehicle longitudinal axis x in a shifted manner.

The same holds true for the further previously described embodiments, in which the extension of the respective door module carrier 1 is variable in vehicle longitudinal direction x by using additional carrier elements 3, 3a, 3b so that the different arrangements of at least one of the guide rails 63, 64 result in vehicle longitudinal direction x.

The concept to provide multiple fastening points for a guide rail of a motor vehicle window lifter so that the guide rail can be arranged in a respective operating position in different positions on the door module carrier, in particular shifted (parallel displaced) in vehicle longitudinal direction x in different positions, can be in general also used for door module carriers, in which no variable extension in vehicle longitudinal direction x is provided or in case of a singular carrier element for instance the basis carrier element of a multi-component module carrier. This is explained in more detail in the following by the means of FIG. 11A ff.

Figure 11B:
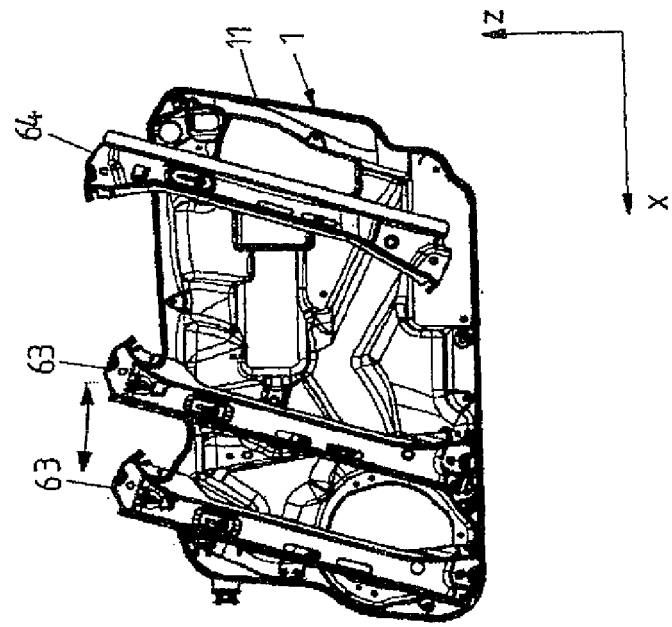
FIG. 11B shows the door module carrier of FIG. 11A together with guide rails being pre-assembled hereon in different fastening positions.
Figure 11A:
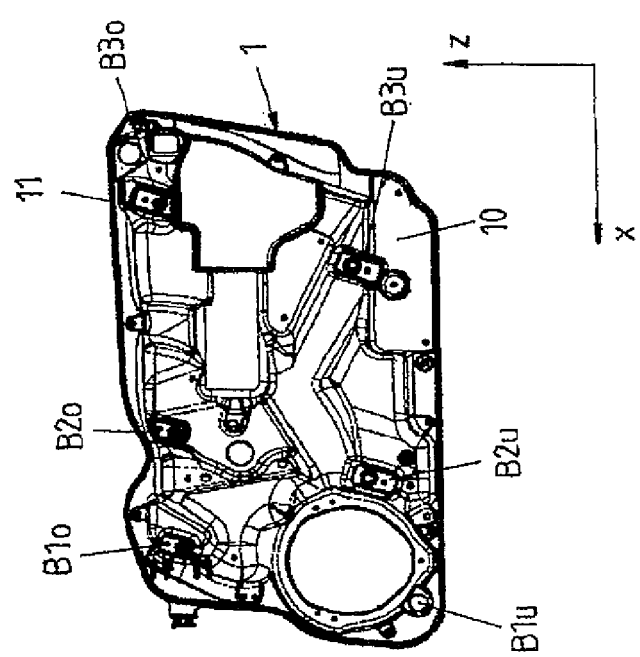
FIG. 11A shows a top view of a door module carrier which comprises at least two sets of fastening points for arranging a guide rail in two different operating positions.

A door module carrier 1 formed by a carrier plate 10, which is limited by a circumferential outer edge 11, is illustrated in FIG. 11A wherein said carrier comprises at least three sets (here in form of three pairs) of fastening points B1, B2, B3 for fastening one guide rail on the door module carrier 1, respectively.

The first two sets or pairs of fastening points B1, B2 serve hereby for the optional fastening of a guide rail 63 of a window lifter being in front in vehicle longitudinal direction x on the door module carrier 1 in two different positions, which are shifted to each other along the vehicle longitudinal direction x, compare FIG. 11B. A third set or a third pair of fastening points B3 serve in contrast the fastening of a second guide rail 64 being in the rear end in vehicle longitudinal direction x.

Each set or each pair of fastening points B1, B2, B3 consist thereby in each case of an along the vertical vehicle axis Z upper fastening point B1$o$, B2$o$, B3$o$ and a lower fastening point B1$u$, B2$u$, B3$u$, wherein the one (lower) fastening point B1$u$ is designed different compared to the other fastening points B1$o$, B2$o$, B3$o$; B2$u$, B3$u$ and is suitable, for instance for a so called screw through solution, in which a fastening element being guided through a deflecting element of the window lifter serves for fastening the guide rail on the door module carrier.

A corresponding positioning of the first, in vehicle longitudinal direction x front guide rail 63 can also be provided in case of a respective singular carrier element, for instance a respective front basis carrier element 2, of the previously described embodiments of multi-component door module carriers. This means that the realization of different operating positions for a guide rail of a window lifter on a door module carrier is independent on the fact that if the carrier element, on which the at least two sets of fastening points being spaced apart from each other along the vehicle longitudinal axis x are provided for the corresponding guide rail 63, is a carrier element which forms the complete door module carrier 1 or is a carrier element which is only a part of the complete door module carrier.

It is important that at hand the (at least two) different positions, which a respective guide rail 63 can have on the module carrier 1—if looked at along the vehicle longitudinal axis x—do not correspond on the one hand to a so called transport position and on the other hand to an operating position. Thus, it is here not the point to fix a guide rail at first in a transport of pre-assembled position on a door module carrier in order to transfer said guide rail then for the latter operation of the window lifter, for instance after the installation of the door module carrier in a motor vehicle door, into its operating or functional position, in which it serves to guide a window pane to be adjusted along an adjustment direction (essentially along the vertical vehicle axis z).

Rather, at hand the two positions, which the front first guide rail 63 can occupy along the vehicle longitudinal direction x and in which said guide rail can be fastened in each case via a corresponding set of fastening points B1$o$, B1$u$ or B2$o$, B2$u$ on the door module carrier 1, are in each case an operating or functional position of the guide rail 63 in which said guide rail serves for guiding a window pane or more exactly a carrier connected to the window pane along an adjustment direction. The two sets of fastening points B1$o$, B1$u$; B2$o$, B2$u$ serve thus to be able to arrange the front first guide rail 63 of the window lifter 6 optionally in one of two operating or functional positions on the door module carrier 1.

At hand it is in each case a so called double-stranded window lifter with two guide rails 63, 64 being spaced apart from each other crosswise to the adjustment direction of the window pane to be adjusted, thus crosswise to the vertical vehicle axis z, of which at least one guide rail 63 can be positioned in two different operating positions. In order to be able to fix also the other rearmost guide rail 64 on the door module carrier 1a total of three sets or pairs of fastening points B1$o$, B1$u$; B2$o$, B2$u$; B3$o$, B3$u$ are thus required. In case of a singular-stranded window lifter with only one guide rail for guiding the window pane to be adjusted accordingly two pairs or sets of fastening points are sufficient, on which the one (only) guide rail of the window lifter can be arranged optionally in one of two possible operating positions.

In FIGS. 12A and 12B a first installation situation of the front guide rail 63 on the door module carrier 1 is illustrated, wherein the latter one is installed in the illustration according to FIG. 12B together with further functional components pre-mounted hereto (lock assembly group 7 and loudspeaker 8) into a door structure T. The FIGS. 12A and 12B represent the along the vehicle longitudinal axis x rearmost possible installation position of the first front guide rail 63 so that said first guide rail has a comparatively small distance to the second rearmost guide rail 64 along the vehicle longitudinal axis x. In contrast, FIGS. 13A and 13B the first guide rail 63 is illustrated in their other installation position being further in front along the vehicle longitudinal axis x.

Figure 13B:
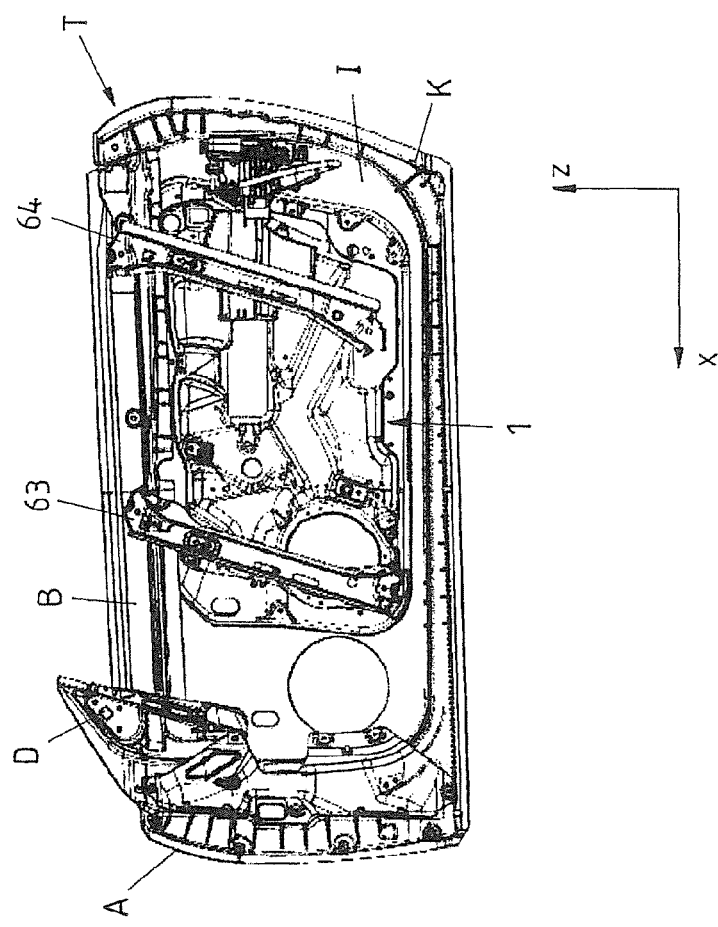
FIG. 13B shows the door module carrier of FIG. 13A installed in a door structure.
Figure 13A:
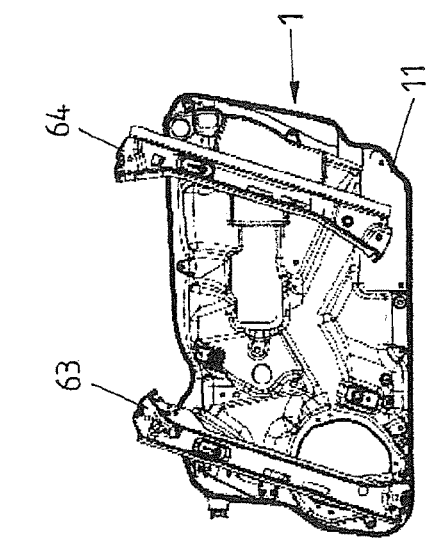
FIG. 13A shows a second possibility of arranging two guide rails on the door module carrier of FIG. 11A.
Figure 14:
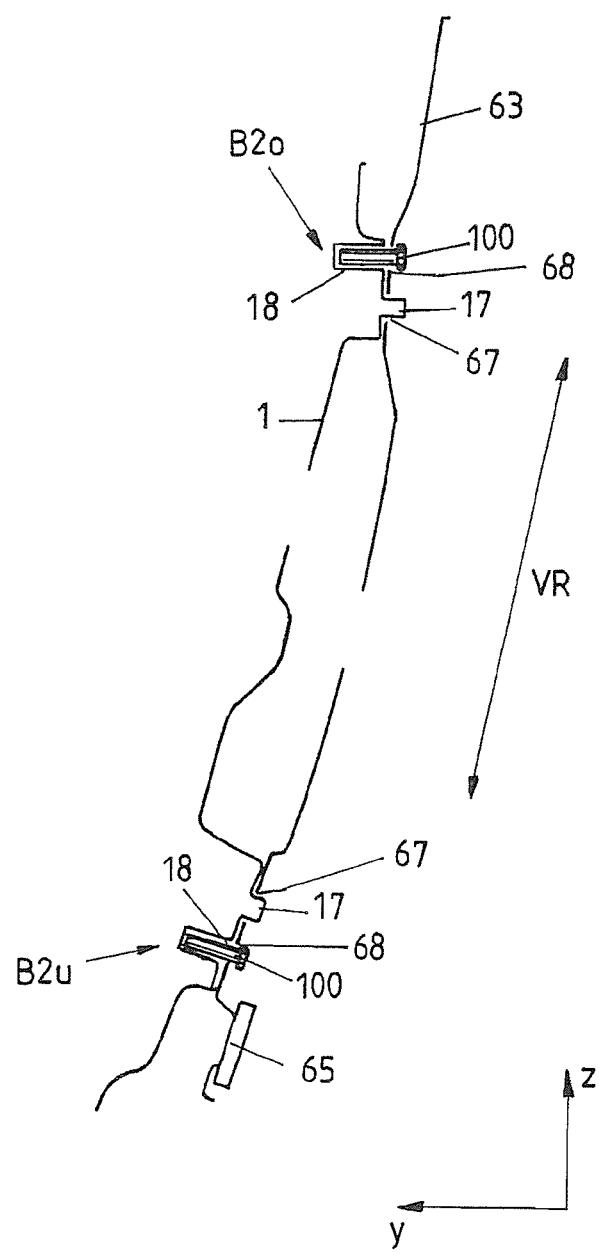
FIG. 14A shows a detailed view of a door module carrier with two guide rails mounted hereon.
FIG. 14B shows a section through the door module carrier of FIG. 14A in the area of a guide rail.

The difference between the installation positions shown in FIGS. 12A and 12B and the installation position illustrated in FIGS. 13A and 13B of the front first guide rail 63, wherein each of the two installation positions represent an operating position of the guide rail 63, corresponds to a parallel displacement of the first guide rail 63 along the vehicle longitudinal direction x. In other words, the two installation positions of the guide rail 63 differ in respect to the spatial position of the guide rail 63 along the vehicle longitudinal direction x. In addition to a displacement of the first guide rail 63 along the vehicle longitudinal direction x of course, a certain change of the spatial orientation of the guide rail 63 in its respective installation position can be provided, for instance in the way that in the two installation positions of the guide rail 63 a different inclination in respect to the vertical vehicle axis z is provided in each case.

Thereby, each of the two installation positions of the guide rail 63 illustrated in FIGS. 12A, 12B on the one hand and FIGS. 13A, 13B on the other hand correspond in each case to an operating or functional position of the guide rail 63, thus a position in which the guide rail 63 is designed and provided to move a window pane to be adjusted (via a carrier guided on the guide rail) along its adjustment direction. This will be subsequently explained in more detail by the means of FIGS. 14A to 15B.

In case of the door structures T illustrated in FIG. 12B on the one hand and in FIG. 13B on the other hand, it can be on the one hand in each case a door structure for frameless motor vehicle doors, thus in particular for a cabriolet or coupe vehicles, which can have in different embodiments quite different long doors (in vehicle longitudinal direction x). This is for instance true for coupe vehicles, which are offered on the one hand in a four-door version and on the other hand in a two-door version, wherein the two-door version has generally larger front doors, as for instance illustrated in FIG. 13B than the four-door version as for instance illustrated in FIG. 12B.

Alternatively, the vehicle door of FIG. 12B can also be a vehicle door provided with a window frame, wherein the corresponding frame (R) in FIG. 12B above the door trimming B is not illustrated.

In FIGS. 14A and 14B the type of fastening of the guide rail 63 on the door module carrier 1 is illustrated in more detail by the example of the first in vehicle longitudinal direction x front guide rail 63, and namely via a set (pair) of fastening points B2o, B2u being spaced apart from each other along the vertical vehicle axis z.

Thereby, the carrier 66 being adjustable along the respective guide rail is illustrated furthermore on each of the two guide rails 63, 64 fastened on the door module carrier 1, wherein carriers 66 carry the window pane FS only indicated in FIG. 14A and can lift or lower said window pane FS in adjustment direction VR by an adjustment movement along their respective in each case assigned guide rail 63, 64. The adjustment force required therefore is introduced into the carrier 66 by a flexible pulling means Z, which is deflected by the means of return pulleys 65o, 65u provided on the guide rail 63, 64 such that it extends in each case with an adjustment section along each of the two guide rails 63, 64, wherein the respective adjustment section of the flexible pulling means Z extending along a guide rail 63, 64 is connected to the local carrier 66. The introduction of force into the flexible pulling means occurs via a window lifter drive, which is not recognizable in FIG. 14A, which shows a top view of the wet room side of the door module carrier 1, since the window lifter drive is usually provided on the drying room side of the door module carrier. The drive moment generated by the adjustment drive is transferred via an output shaft reaching through the door module carrier 1 onto a adjustment gear 62, which drives a rotatably mounted cable drum being wrapped by the flexible pulling means Z in order to transfer the driving moment generated by the adjustment drive onto the flexible pulling means and about this onto the carriers 66 being guided on the guide rail 63, 64, which in turn carry the window pane FS during an adjustment movement along the guide rails 63, 64.

In case of the door module carrier 1 illustrated in FIG. 14A it can be on the one hand a complete door module carrier and on the other hand only a basis carrier element 2 of the door module carrier, which optionally is to be supplemented by an additional carrier element.

As in particular recognizable by the means of the cross section of the door module carrier 1 illustrated in FIG. 14B in the area of the first front guide rail 63 the two fastening points B2o, B2u being spaced apart from each other along the vertical vehicle axis z in each case a positioning element 17 projecting from the door module carrier 1, here in form of a positioning pin, which engages in an assigned positioning opening 67 of the guide rail 63 so that said guide rail is positioned in a defined manner on the door module carrier 1. A fixed connection between the guide rail 63 and the door module carrier 1 is then obtained by mounting bolts 100 (here in form of threaded bolts or screws), which reach on the respective fastening point B2o, B2u in each case through a through opening/fastening opening 68 in the guide rail 6 and are screwed into a fastening part being assigned to the door module carrier 1 defining a fastening opening 18 and carrying an internal thread. However, also other types of fastening the respective guide rail on the door module carrier can be in general implemented.

A modification of the arrangement of FIGS. 14A and 14B is illustrated in FIGS. 15A and 15B, wherein a basic difference is that here only the upper deflecting element 65o in form of a return pulley (via a bearing bolt L) is mounted in a simple manner on the guide rail 63, while in the area of the lower deflecting element 65u, more specifically, in the axis thereof, an adjusting element E is provided in order to be able to adjust the position of the guide rail 63 relative to the door module carrier 1 along the horizontal vehicle cross axis y. This is in particular of importance in case of frameless doors.

The adjustment element E can serve in a known manner in a double function at the same time also as a fastening element for fastening the guide rail 63 on the door module carrier 1 (so called through screw solution). A fastening of the guide rail 63 via the lower fastening opening 18 formed on a fastening part carrying an internal thread can then be avoided.

The invention claimed is:

1. A door module for installation in a motor vehicle door comprising:
   a door module carrier to be installed in a motor vehicle door, and
   a plurality of functional components of the motor vehicle door pre-installed on the door module carrier, which are to be installed together with the door module carrier in the motor vehicle door,
   wherein the functional components comprise at least a first guide rail and a second guide rail of a motor vehicle window lifter, wherein the first and the second guide rails are fixed in an operating position at fastening points on the door module carrier such that the first and second guide rails each extend in their respective operating position along an adjustment direction of a window pane to be adjusted by the window lifter, and wherein the window pane can be guided by the first and second guide rails being in their operating positions along said adjustment direction,
   wherein at least two different sets of fastening points spaced apart from each other are provided on the door module carrier which serve for a selective arrangement of the first guide rail of the window lifter in one of a plurality of operating positions, wherein the first guide rail is aligned in one of the operating positions for guiding the window pane to be adjusted by the window lifter along the adjustment direction thereof,
   wherein, when the door module carrier is installed in the motor vehicle door, each set of fastening points on the door module carrier for the operating positions comprises at least two fastening points being spaced apart from each other along a vertical vehicle axis,
   wherein in the operating positions of the first guide rail, the first guide rail has the same spatial orientation so that a transfer of the first guide rail relative to the second guide rail from a first operating position into a second operating position corresponds to a parallel displacement of the first guide rail, and
   wherein, in the first operating position, any point on the first guide rail is arranged at a first distance from a point on the second guide rail and wherein, in the second operating position, the point on the first guide rail is arranged at a second, different distance from the point on the second guide rail.

2. The door module according to claim 1, wherein the guide rail extends along the adjustment direction of the window pane to be adjusted by the window lifter in each of the operating positions, in which said first guide rail can be mounted on the door module carrier via one set of fastening points of the door module carrier.

3. The door module according to claim 1, wherein a carrier is configured to be movably guided on at least one of the first and second guide rails along an extension direction of the first or second guide rail, wherein the window pane to be adjusted is fastened to said carrier.

4. The door module according to claim 3, wherein the first guide rail extends in one of the operating positions in which said first guide rail can be arranged selectively on the door module carrier along the adjustment direction of the window pane to be adjusted by the window lifter such that the window pane being fastened to the carrier is moved when displacing the carrier along the first guide rail in the adjustment direction.

5. The door module according to claim 1, wherein the two different sets of fastening points on the door module carrier are spaced apart from each other along a longitudinal axis of the motor vehicle.

6. The door module according to claim 1, wherein the operating positions in which the first guide rail can be fixed on the door module carrier via the at least two sets of fastening points of the door module carrier are spaced apart from each other along the vehicle longitudinal axis.

7. The door module according to claim 1, wherein a respective fastening point provided on the door module carrier of the at least two sets of fastening points on the door module carrier comprises a fastening opening for a fastening element by which the first guide rail can be locally fixed to the respective fastening point of the door module carrier.

8. The door module according to claim 7, wherein the fastening opening is formed on a part being separated from a material of the door module carrier and being fixed to the door module carrier.

9. The door module according to claim 1, wherein positioning pins are provided on the door module carrier via which the first guide rail can be positioned in its respective operating position on the door module carrier.

10. The door module according to claim 1, wherein the window lifter is formed as a multi-stranded, window lifter.

11. The door module according to claim 1, wherein the window lifter is formed as a pulley window lifter comprising a flexible pulling means which can be actuated by a window lifter drive and guided with an adjustment section along at least one of the first and second guide rails, wherein the flexible pulling means is connected to a carrier being mounted longitudinally displaceably on the first or second guide rail which carries the window pane to be adjusted.

12. The door module according to claim 7, wherein the fastening opening is formed as a thread opening into which a threaded fastening element can be screwed.

13. The door module according to claim 9, wherein the each of the positioning pins corresponds to a positioning opening on the guide rail.

14. The door module according to claim 10, wherein the window lifter is formed as a two-stranded window lifter.

15. The door module according to claim 1, wherein the first guide rail in its first operating position is located closer to the second guide rail than in its at least one other operating position.

* * * * *